(12) United States Patent
Chen et al.

(10) Patent No.: US 12,240,559 B2
(45) Date of Patent: Mar. 4, 2025

(54) HUB MOTOR ARRANGEMENTS, SYSTEMS, AND METHODS

(71) Applicant: Razor USA LLC, Cerritos, CA (US)

(72) Inventors: Robert Chen, Cerritos, CA (US); Fu-Yao Wang (Yau Wang), New Taipei (TW); Shih-Chen Lu (Louis Lu), New Taipei (TW); Ian Desberg, Cerritos, CA (US); Robert Hadley, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 110 days.

(21) Appl. No.: 17/807,334

(22) Filed: Jun. 16, 2022

(65) Prior Publication Data

US 2023/0133794 A1    May 4, 2023

Related U.S. Application Data

(60) Provisional application No. 63/202,656, filed on Jun. 18, 2021.

(51) Int. Cl.
*B62K 3/00* (2006.01)
*B62J 43/10* (2020.01)
(Continued)

(52) U.S. Cl.
CPC ............... *B62K 3/002* (2013.01); *B62J 43/10* (2020.02); *B62K 21/12* (2013.01); *B62M 11/00* (2013.01); *B62K 2202/00* (2013.01)

(58) Field of Classification Search
CPC .... B62K 3/002; B62K 21/12; B62K 2202/00; B62J 43/10; B62M 11/00
(Continued)

(56) References Cited

U.S. PATENT DOCUMENTS 3,704,759 A    12/1972  Vitkov et al.
3,737,000 A     6/1973  Knobloch et al.
(Continued)

FOREIGN PATENT DOCUMENTS

AU         416302 B2    8/1971
CN         2314959 Y    4/1999
(Continued)

OTHER PUBLICATIONS

Chinese Journal: Planetary gear transmission design, published Sep. 30, 2003, in 9 pages.
(Continued)

*Primary Examiner* — Hau V Phan
(74) *Attorney, Agent, or Firm* — Knobbe, Martens, Olson & Bear, LLP

(57) ABSTRACT

Various hub motor arrangements, systems, and methods are disclosed. The hub motor arrangement may include a transmission assembly to provide increased torque. The transmission assembly may include a motor gear, a planetary gear, an idler gear, and a ring gear. The idler gear may be positioned farther away from an axis of rotation of the hub motor arrangement compared to the planetary gear. The motor gear may drive the planetary gear, the planetary gear may drive the idler gear, and idler gear may drive the ring gear. The rotation of the ring gear may rotate a housing of the hub motor arrangement to propel a vehicle incorporating the hub motor arrangement.

19 Claims, 13 Drawing Sheets

(51) Int. Cl.
  B62K 21/12 (2006.01)
  B62M 11/00 (2006.01)
(58) Field of Classification Search
  USPC ........................................................ 180/5.1
  See application file for complete search history.

(56) References Cited

U.S. PATENT DOCUMENTS

| | | | |
|---|---|---|---|
| 3,770,075 | A | 11/1973 | Vegners |
| 3,812,928 | A | 5/1974 | Rockwell et al. |
| 3,897,843 | A * | 8/1975 | Hapeman ................. B60T 1/06 |
| | | | 310/67 R |
| 4,424,879 | A | 1/1984 | Sonzogni |
| 4,617,839 | A | 10/1986 | Matoba |
| 5,246,082 | A | 9/1993 | Alber |
| 5,616,097 | A | 4/1997 | Dammon |
| 5,928,099 | A | 7/1999 | Tsunemi |
| 6,276,475 | B1 | 8/2001 | Nakanosono |
| 6,355,996 | B1 | 3/2002 | Birkestrand |
| 6,367,571 | B1 | 4/2002 | Scwarz |
| 6,458,057 | B2 | 10/2002 | Massaccesi |
| 6,524,206 | B2 | 2/2003 | Tsunemi |
| 6,702,070 | B2 | 3/2004 | Smith |
| 6,712,727 | B2 | 3/2004 | Kujira et al. |
| 6,749,532 | B2 | 6/2004 | Wachauer |
| 6,931,959 | B2 | 8/2005 | Giuriati |
| 6,974,399 | B2 | 12/2005 | Lo |
| 7,249,643 | B2 | 7/2007 | Etzioni et al. |
| 7,375,450 | B2 | 5/2008 | Tanaka et al. |
| 7,886,858 | B2 | 2/2011 | Ai |
| 8,186,467 | B2 * | 5/2012 | Yoshino ............... B60K 17/046 |
| | | | 903/910 |
| 8,245,804 | B2 | 8/2012 | van Rooij |
| 8,316,973 | B2 | 11/2012 | Walter et al. |
| 8,323,143 | B2 | 12/2012 | Schoon |
| 8,348,798 | B2 * | 1/2013 | Lo ........................... B60K 1/04 |
| | | | 475/149 |
| 8,419,581 | B2 | 4/2013 | Lo |
| 8,449,424 | B2 | 5/2013 | Schoon |
| 8,628,449 | B1 | 1/2014 | Burgman et al. |
| 8,662,277 | B2 | 3/2014 | Schoon |
| 8,674,573 | B2 | 3/2014 | Adachi |
| 8,702,549 | B2 | 4/2014 | Yoshino et al. |
| 8,783,393 | B2 | 7/2014 | Beslery |
| 8,795,120 | B2 | 8/2014 | Kim, II |
| 9,017,206 | B2 | 4/2015 | Nakamura et al. |
| 9,046,154 | B2 | 6/2015 | Ishizuka |
| 9,103,380 | B2 | 8/2015 | Hirano |
| 9,303,727 | B2 | 4/2016 | Reimann |
| 9,308,965 | B2 | 4/2016 | Folmli et al. |
| 9,638,285 | B2 | 5/2017 | Huang |
| 9,660,500 | B2 | 5/2017 | Huang |
| 9,758,213 | B2 | 9/2017 | Kawakami |
| 9,855,992 | B1 * | 1/2018 | Liang .................. B60K 17/046 |
| 9,914,348 | B2 * | 3/2018 | Koval .................. B60K 17/356 |
| 9,950,562 | B2 | 4/2018 | Forrest |
| 10,226,997 | B2 | 3/2019 | Huang |
| 10,432,064 | B2 | 10/2019 | Huang |
| 10,479,190 | B2 | 11/2019 | Li et al. |
| 10,897,181 | B2 | 1/2021 | Huang |
| 10,899,224 | B2 | 1/2021 | Huang |
| 11,472,284 | B2 | 10/2022 | Huang |
| 11,901,796 | B2 | 2/2024 | Huang |
| 2004/0012246 | A1 | 1/2004 | Rhyne et al. |
| 2005/0176542 | A1 | 8/2005 | Lo |
| 2005/0264112 | A1 | 12/2005 | Tanaka et al. |
| 2009/0032321 | A1 | 2/2009 | Marsh et al. |
| 2010/0304918 | A1 | 12/2010 | Burgman et al. |
| 2010/0307851 | A1 | 12/2010 | Spanski et al. |
| 2012/0083375 | A1 | 4/2012 | Lo |
| 2012/0083376 | A1 | 4/2012 | Lo |
| 2012/0309578 | A1 | 12/2012 | Solka |
| 2013/0012350 | A1 | 1/2013 | Ebner |
| 2013/0109526 | A1 | 5/2013 | Oishi |
| 2013/0192400 | A1 | 8/2013 | Dodo et al. |
| 2013/0284527 | A1 | 10/2013 | Murakami et al. |
| 2014/0080652 | A1 | 3/2014 | Kim |
| 2014/0135166 | A1 * | 5/2014 | Wang ..................... F16H 1/46 |
| | | | 29/893.1 |
| 2015/0133253 | A1 | 5/2015 | Huang |
| 2015/0239527 | A1 | 8/2015 | Huang |
| 2015/0246710 | A1 | 9/2015 | Yeh |
| 2015/0247539 | A1 | 9/2015 | Yeh |
| 2016/0263987 | A1 | 9/2016 | Brownell et al. |
| 2016/0297500 | A1 | 10/2016 | Dubose |
| 2017/0152002 | A1 | 6/2017 | Yamamoto |
| 2018/0022411 | A1 * | 1/2018 | Kistemaker ............ A63B 55/60 |
| | | | 180/208 |
| 2020/0384806 | A1 | 12/2020 | Falls et al. |
| 2021/0023699 | A1 * | 1/2021 | Darby ..................... B25J 9/126 |
| 2021/0379987 | A1 | 12/2021 | Huang |
| 2022/0371686 | A1 | 11/2022 | Chen et al. |
| 2023/0099907 | A1 | 3/2023 | Chung et al. |

FOREIGN PATENT DOCUMENTS

| | | |
|---|---|---|
| CN | 1702015 A | 11/2005 |
| CN | 201447041 U | 5/2010 |
| CN | 20292823 U | 5/2013 |
| DE | 2051686 A1 | 4/1971 |
| DE | 10103726 A1 | 8/2002 |
| EP | 1601085 | 11/2005 |
| EP | 2586694 | 5/2013 |
| EP | 2483142 B1 | 9/2015 |
| KR | 20090103259 A | 10/2009 |
| KR | 20160041733 A | 4/2016 |
| TW | M390917 U1 | 10/2010 |
| WO | WO 2011/013109 A1 | 2/2011 |
| WO | WO 2016/183095 A1 | 11/2016 |
| WO | WO 2019/180857 A1 | 5/2020 |
| WO | WO 2022/246094 A1 | 11/2022 |
| WO | WO 2022/266369 A1 | 12/2022 |

OTHER PUBLICATIONS

Decision of Patent Re-examination Board regarding Invalidation Declaration Request filed against Chinese Utility Model No. CN 204334222U, dated Nov. 5, 2019, in 62 pages.
European Extended Search Report in corresponding European Application No. 16793376.1, dated Feb. 12, 2019, in 9 pages.
International Preliminary Report on Patentability in corresponding International Patent Application No. PCT/US2014/065476, mailed May 26, 2016, in 15 pages.
International Search Report and Written Opinion in corresponding International Patent Application No. PCT/US2016/031664, mailed Aug. 8, 2016, in 10 pages.
International Preliminary Report on Patentability in corresponding International Patent Application No. PCT/US2016/031664, dated Nov. 23, 2017, in 9 pages.
Invalidation Declaration Request filed against Chinese Utility Model No. CN 204334222U, received on Apr. 26, 2019, in 48 pages.
PCT Search Report and Written Opinion for PCT/US2014/065476 dated Mar. 18, 2015.
Petition to Appeal Decision of Patent Re-examination Board regarding Invalidation Declaration Request filed against Chinese Utility Model No. CN 204334222U, dated Feb. 4, 2020, in 11 pages.
International Search Report and Written Opinion in corresponding International Patent Application No. PCT/US2022/033862, mailed Sep. 23, 2022, in 10 pages.

* cited by examiner

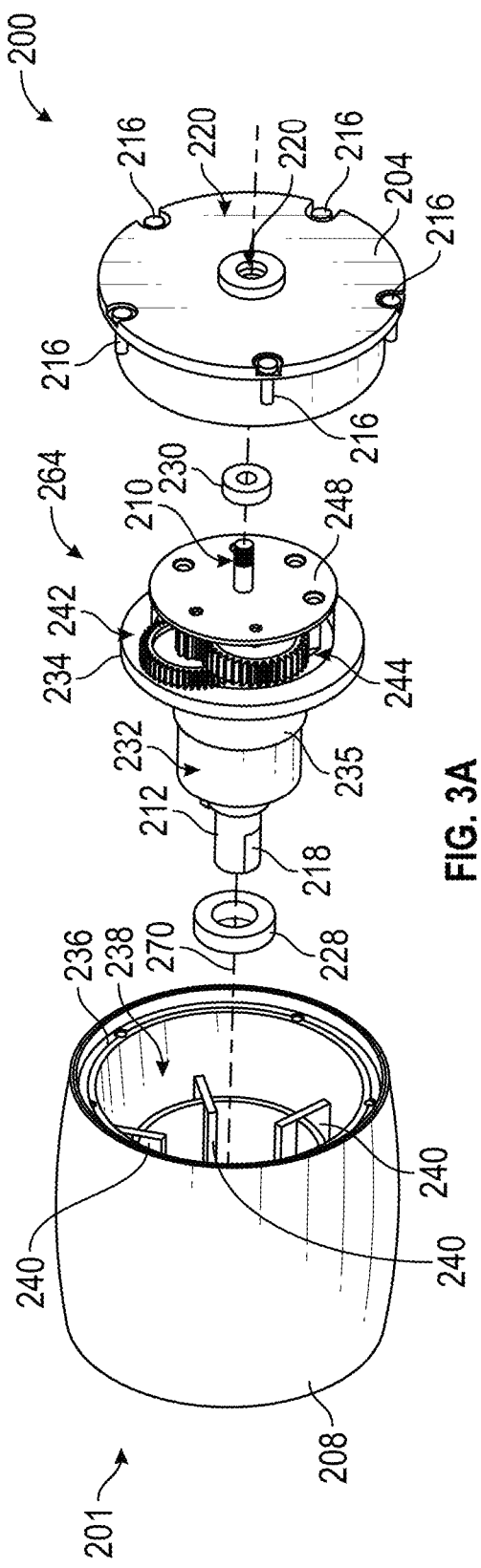
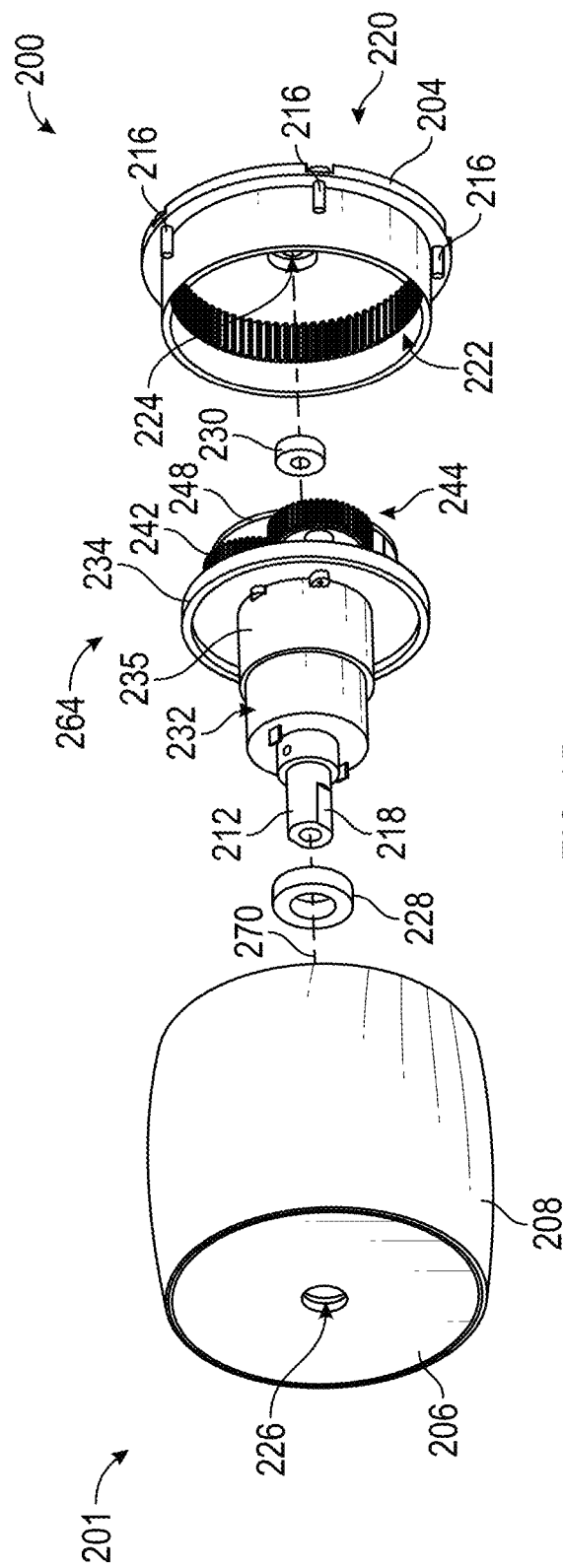
FIG. 3A
FIG. 3B

HUB MOTOR ARRANGEMENTS, SYSTEMS, AND METHODS

CROSS REFERENCE

This application claims the priority benefit of U.S. Provisional Application No. 63/202,656, filed Jun. 18, 2021, which is hereby incorporated by reference in its entirety. All applications for which a foreign or domestic priority is identified in the Application Data Sheet as filed with the present application are hereby incorporated by reference under 37 CFR 1.57.

FIELD

This disclosure relates to hub motors arrangements and vehicles incorporating hub motor arrangements.

BACKGROUND

Hub motors can be used to propel certain types of vehicles, such as scooters, electric bicycles, or otherwise. Such hub motors often incorporate custom and/or large electric motor arrangements, which results in the hub motor being heavy, bulky, and/or expensive.

SUMMARY OF CERTAIN FEATURES

Powered light-weight vehicles, such as children's vehicles, often utilize an electric motor to power one or more wheels of the vehicle. Providing the powered light-weight vehicle with a desirable operating experience at a reasonably low cost is often a design objective. For example, users of such powered light-weight vehicles may desire rapid acceleration, the ability to quickly climb inclines, and/or improved efficiency. As such, it may be desirable to include in the powered light-weight vehicle one or more hub motor arrangements with increased torque for improved acceleration, climbing, and/or efficiency at a reasonably low cost.

Accordingly, improved hub motor arrangements that can be incorporated with light-weight vehicles, such as children's vehicles, to provide one or more benefits (e.g., increased torque) are disclosed herein. The hub motor arrangements may include a transmission assembly that can include a larger ring gear (e.g., larger diameter) to facilitate a larger gear ratio to provide increased torque. For example, the transmission assembly may include a first gear (e.g., planetary gear) positioned a first distance away from a rotational axis of the hub motor arrangement and a second gear (e.g., idler gear) positioned a second distance, greater than the first distance, away from the rotational axis of the hub motor arrangement. The motor can drive the first gear, the first gear can drive the second gear, and the second gear can drive the ring gear which drives a rotation of a housing and/or tire of the hub motor arrangement to propel a vehicle incorporating the hub motor arrangement. The inclusion of the second gear can enable a larger ring gear (e.g., larger diameter) to be used to provide a larger gear ratio and increased torque compared to a transmission assembly without the second gear.

In some embodiments, the first gear can be a double gear, e.g., step gear. The first gear can include an inner gear and an outer gear that are fixedly connected together. The outer gear of the first gear can be driven by a motor gear (e.g., sun gear) and the inner gear can drive the second gear. As described, the second gear can drive the ring gear which drives the rotation of the housing and/or tire of the hub motor arrangement to propel the vehicle incorporating the hub motor arrangement.

In some embodiments, a hub motor arrangement is disclosed herein. The hub motor arrangement may be incorporated with a vehicle. The hub motor arrangement may include a housing that can rotate about an axis of rotation on a first axle and a second axle. The hub motor arrangement may include a motor unit that may have a motor gear. The hub motor arrangement may include a plurality of gears that can include a first gear and a second gear. The first gear can include a first axis of rotation a first distance away from the axis of rotation of the housing. The second gear can include a second axis of rotation a second distance away from the axis of rotation of the housing. The second distance may be larger than the first distance. The hub motor arrangement may include a ring gear that may rotate with the housing. The motor gear may drive the first gear. The first gear may drive the second gear. The second gear may drive the ring gear to rotate the housing.

In some embodiments, the first axle and the second axle may be disposed on opposing sides of the housing.

In some embodiments, the first axle and the second axle may form a distributed axle.

In some embodiments, the first axle and the second axle may not extend through an entirety of the housing.

In some embodiments, the first axle and the second axle may be be coupled to a vehicle to support the hub motor arrangement.

In some embodiments, the motor may be an electric motor.

In some embodiments, the first gear may be a double gear.

In some embodiments, the first gear may include an outer gear and an inner gear.

In some embodiments, the motor gear may interface with the outer gear of the first gear.

In some embodiments, the inner gear of the first gear may interface with the second gear.

In some embodiments, the first gear may be a planetary gear.

In some embodiments, the second gear may be an idler gear.

In some embodiments, the hub motor arrangement may include a first bearing and a second bearing. The first bearing may be disposed on the first axle between the first axle and the housing. The second bearing may be disposed on the second axle between the second axle and the housing.

In some embodiments, the ring gear may be unitarily formed with the housing.

In some embodiments, the ring gear may be coupled to the housing.

In some embodiments, the hub moto arrangement may include a cover. The ring gear may be formed in the cover.

In some embodiments, the hub moto arrangement may include a first lateral support and a second lateral support. The first gear and the second gear may be disposed between the first lateral support and the second lateral support.

In some embodiments, the first lateral support and the second lateral support are disposed within the housing.

In some embodiments, the second lateral support may include a sleeve. The sleeve may be disposed around the motor unit.

In some embodiments, the first lateral support may include a first mount that may contact the second lateral support to space the first lateral support away from the second lateral support.

In some embodiments, the first mount may have a C-shape.

In some embodiments, the second lateral support may include a second mount that may contact the first lateral support to space the second lateral support away from the first lateral support.

In some embodiments, the second mount may have a C-shape.

In some embodiments, the first axle may extend from the first lateral support.

In some embodiments, the hub motor arrangement may include a first shaft and a second shaft. The first shaft and the second shaft may connect to and extend between the first lateral support and the second lateral support. The first gear may be disposed on the first shaft and the second gear may be disposed on the second shaft.

In some embodiments, the hub motor arrangement may include one bearing disposed on the first shaft between the first shaft and the first gear and another bearing disposed on the second shaft between the second shaft and the second gear.

In some embodiments, the motor unit may be disposed on the axis of rotation of the housing.

In some embodiments, a vehicle that may include the hub motor arrangement is disclosed herein. The hub motor arrangement may be disposed in a wheel of the vehicle.

In some embodiments, the vehicle may be an electric scooter that may have handle bars, a deck, and a battery.

In some embodiments, the vehicle may be a three-wheeled ride-on vehicle.

In some embodiments, the vehicle may be a four-wheeled ride-on vehicle.

In some embodiments, the vehicle may be a powered light-weight vehicle.

In some embodiments, the vehicle may be configured for children.

In some embodiments, a hub motor arrangement for a vehicle is disclosed herein. The hub motor arrangement may include a hub that may rotate about an axis of rotation on a first shaft and a second shaft. The hub motor arrangement may include a motor that may include a motor gear. The hub motor arrangement may include a plurality of gears that can include a step gear and an idler gear. The step gear may have a first axis of rotation a first distance away from the axis of rotation of the hub. The idler gear may have a second axis of rotation a second distance away from the axis of rotation of the hub. The second distance may be larger than the first distance. The hub motor arrangement may include a ring gear that may rotate with the hub. The motor gear may drive the step gear. The step gear may drive the idler gear. The idler gear may drive the ring gear to rotate the hub.

In some embodiments, the first shaft and the second shaft may be disposed on opposing sides of the hub.

In some embodiments, the first shaft and the second shaft may form a distributed axle.

In some embodiments, the first shaft and the second shaft may not extend through an entirety of the hub.

In some embodiments, the first shaft and the second shaft may be coupled to a vehicle to support the hub motor arrangement.

In some embodiments, the motor may be an electric motor.

In some embodiments, the step gear may include an outer gear and an inner gear.

In some embodiments, the motor gear may interface with the outer gear of the step gear.

In some embodiments, the inner gear of the step gear may interface with the idler gear.

In some embodiments, the step gear may be a planetary gear.

In some embodiments, the hub motor arrangement may include a first bearing and a second bearing. The first bearing may be disposed on the first shaft between the first shaft and the hub. The second bearing may be disposed on the second shaft between the second shaft and the hub.

In some embodiments, the ring gear may be unitarily formed with the hub.

In some embodiments, the ring gear may be coupled to the hub.

In some embodiments, the hub motor arrangement may include a cover. The ring gear may be formed in the cover.

In some embodiments, the hub motor arrangement may include a gearbox body and a gearbox cover. The step gear and the idler gear may be disposed between the gearbox body and the gearbox cover.

In some embodiments, the gearbox body and the gearbox cover may be disposed within the hub.

In some embodiments, the gearbox body may include a sleeve. The sleeve may be disposed around the motor unit.

In some embodiments, the gearbox cover may include a first mount that may contact the gearbox body to space the gearbox cover away from the gearbox body.

In some embodiments, the first mount may include a C-shape.

In some embodiments, the gearbox body may include a second mount that may contact the gearbox cover to space the gearbox cover away from the gearbox cover.

In some embodiments, the second mount may include a C-shape.

In some embodiments, the first axle may extend from the gearbox cover.

In some embodiments, the hub motor arrangement may include a first connecting shaft and a second connecting shaft. The first connecting shaft and the second connecting shaft may connect to and extend between the gearbox cover and the gearbox body. The step gear may be disposed on the first connecting shaft and the idler gear may be disposed on the second connecting shaft.

In some embodiments, the hub motor arrangement may include one bearing disposed on the first connecting shaft between the first connecting shaft and the step gear and another bearing disposed on the second connecting shaft between the second connecting shaft and the idler gear.

In some embodiments, the motor may be disposed on the axis of rotation of the hub.

In some embodiments, a vehicle that may include the hub motor arrangement is disclosed herein. The hub motor arrangement may be disposed in a wheel of the vehicle.

In some embodiments, the vehicle may be an electric scooter that can include handle bars, a deck, and a battery.

In some embodiments, the vehicle may be a three-wheeled ride-on vehicle.

In some embodiments, the vehicle may be a four-wheeled ride-on vehicle.

In some embodiments, the vehicle may be a powered light-weight vehicle.

In some embodiments, the vehicle may be configured for children.

In some embodiments, a hub motor arrangement for a vehicle is disclosed herein. The hub motor arrangement may include a housing that may to rotate about an axis of rotation on an axle. The hub motor arrangement may include a motor that can have a motor gear. The hub motor arrangement may include a plurality of gears that can include a first gear and a second gear. The first gear may be at a first distance away from the axis of rotation. The second gear may be at a second distance away from the axis of rotation. The second distance may be larger than the first distance. The hub motor arrangement may include a ring gear that may rotate with the housing. The motor gear may drive the first gear. The first gear may drive the second gear. The second gear may drive the ring gear to rotate the housing.

In some embodiments, the first gear may include a first axis of rotation the first distance away from the axis of rotation of the housing. The second gear may include a second axis of rotation the second distance away from the axis of rotation of the housing.

In some embodiments, the axle may be a first axle and the hub motor arrangement may include a second axle.

In some embodiments, the axle may be coupled to a vehicle to support the hub motor arrangement.

In some embodiments, the first gear may be a double gear.

In some embodiments, the first gear may have an outer gear and an inner gear.

In some embodiments, the motor gear may interface with the outer gear of the first gear.

In some embodiments, the inner gear of the first gear may interface with the second gear.

In some embodiments, the first gear may be a planetary gear.

In some embodiments, the second gear may be an idler gear.

In some embodiments, the hub motor arrangement may include a first lateral support and a second lateral support. The first gear and the second gear may be disposed between the first lateral support and the second lateral support.

In some embodiments, the first lateral support and the second lateral support may be disposed within the housing.

In some embodiments, the second lateral support may include a sleeve. The sleeve may be disposed around the motor.

In some embodiments, the first lateral support may include a first mount that can contact the second lateral support to space the first lateral support away from the second lateral support.

In some embodiments, the second lateral support may include a second mount that can contact the first lateral support to space the second lateral support away from the first lateral support.

In some embodiments, the hub motor arrangement may include a first shaft and a second shaft. The first shaft and the second shaft may connect to and extend between the first lateral support and the second lateral support. The first gear may be disposed on the first shaft and the second gear may be disposed on the second shaft.

In some embodiments, a vehicle may include the hub motor arrangement is disclosed herein. The hub motor arrangement may be disposed in a wheel of the vehicle.

In some embodiments, a hub motor arrangement for a vehicle is disclosed herein. The hub motor arrangement may include a housing that may to rotate about an axis of rotation. The hub motor arrangement may include a motor that can have a motor gear. The hub motor arrangement may include a plurality of gears that can include a first gear and a second gear. The hub motor arrangement may include a ring gear that can rotate with the housing. The motor gear may drive the first gear. The first gear may drive the second gear. The second gear may drive the ring gear to rotate the housing.

In some embodiments, the first gear may be a first distance away from the axis of rotation. The second gear may be a second distance away from the axis of rotation. The second distance may be larger than the first distance.

In some embodiments, the first gear may include a first axis of rotation the first distance away from the axis of rotation of the housing. The second gear may include a second axis of rotation the second distance away from the axis of rotation of the housing. The second distance may be larger than the first distance.

In some embodiments, the hub motor arrangement may include an axle.

In some embodiments, the axle may be coupled to a vehicle to support the hub motor arrangement.

In some embodiments, the axle may be a first axle and the hub motor arrangement may include a second axle.

In some embodiments, the first gear may be a double gear.

In some embodiments, the first gear may include an outer gear and an inner gear.

In some embodiments, the motor gear may interface with the outer gear of the first gear.

In some embodiments, the inner gear of the first gear may interface with the second gear.

In some embodiments, the first gear may be a planetary gear.

In some embodiments, the second gear may be an idler gear.

In some embodiments, the hub motor arrangement may include a first lateral support and a second lateral support. The first gear and the second gear may be disposed between the first lateral support and the second lateral support.

In some embodiments, the first lateral support and the second lateral support may be disposed within the housing.

In some embodiments, the second lateral support may include a sleeve. The sleeve may be disposed around the motor.

In some embodiments, the first lateral support may include a first mount that can contact the second lateral support to space the first lateral support away from the second lateral support.

In some embodiments, the second lateral support may include a second mount can contact the first lateral support to space the second lateral support away from the first lateral support.

In some embodiments, the hub motor arrangement may include a first shaft and a second shaft. The first shaft and the second shaft may connect to and extend between the first lateral support and the second lateral support. The first gear may be disposed on the first shaft and the second gear may be disposed on the second shaft.

In some embodiments, a vehicle may include the hub motor arrangement. The hub motor arrangement may be disposed in a wheel of the vehicle. In some embodiments, the housing may include an outer wall. The outer wall may have a circular profile that tapers in diameter from a middle portion to lateral portions. The middle portion may include a larger diameter than the lateral portions. In some embodiments, the hub may include an outer wall. The outer wall may have a circular profile that tapers in diameter from a middle portion to lateral portions, the middle portion comprising a larger diameter than the lateral portions. In some embodiments, a tire that fits over the outer wall of the housing or hub may include a circular outer periphery that tapers in diameter from a middle portion to lateral portion. The middle portion may include a larger diameter than the lateral portions.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

FIG. 3A illustrates a front perspective exploded view of the hub motor arrangement of FIGS. 2A-2D.

FIG. 3B illustrates a rear perspective exploded view of the hub motor arrangement of FIGS. 2A-2D.

DETAILED DESCRIPTION OF CERTAIN EMBODIMENTS

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1A:
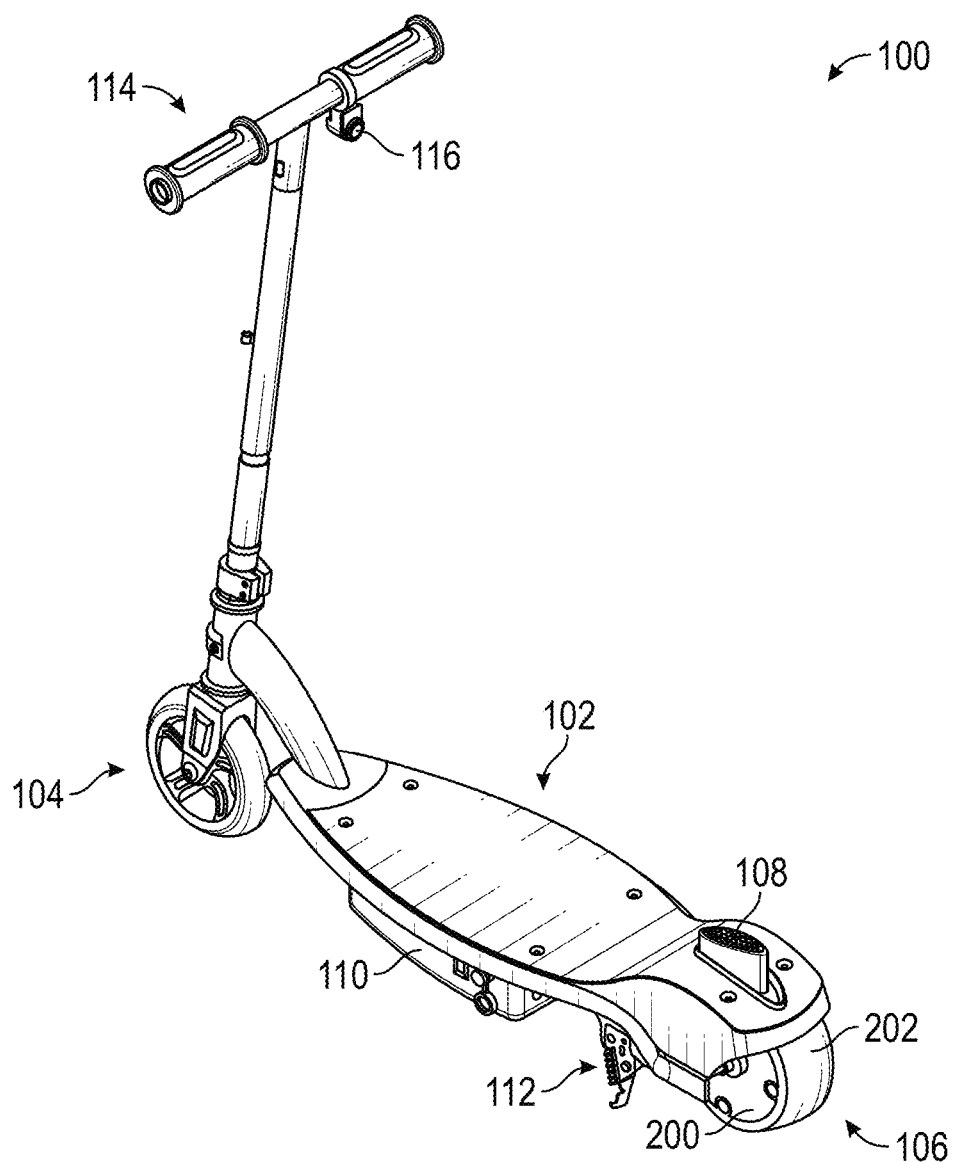
FIGS. 1A and 1B illustrate an example vehicle with a hub motor arrangement.
Figure 1B:
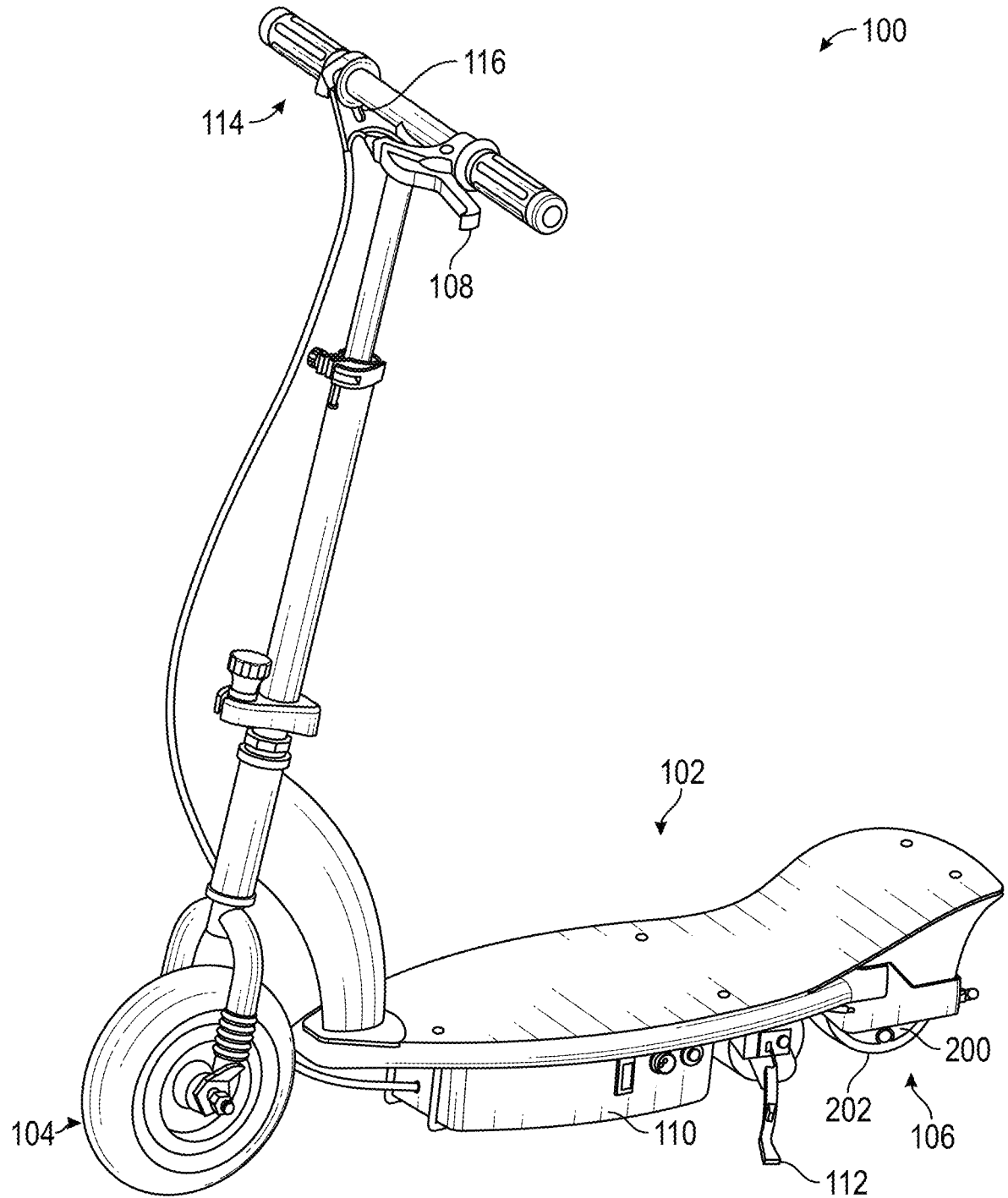

Powered Light-Weight Vehicles—FIGS. 1A and 1B

Various embodiments and configurations of a hub motor arrangement are disclosed herein. The hub motor arrangements disclosed herein can be incorporated with a variety of vehicles, which can include powered light-weight vehicles such as powered scooters, skateboards, long boards, bikes, ride-on vehicles, balance boards, skates, go carts, caster-wheeled carts, and/or others.

FIGS. 1A and 1B illustrate examples of a vehicle 100 that a user, such as a child, may ride. The vehicle 100 can include a body 102. The body 102 may support one or more users. For example, the body 102 may include a deck surface upon which one or more users may stand. The body 102 may be supported by one or more wheels, which may include a front wheel 104 and a rear wheel 106. In some embodiments, the body 102 may be supported by three, four, or more wheels. The front wheel 104 may be controlled (e.g., turned) with a steering device 114, which may be a steering wheel, handle bars, steering yoke, and/or others. The rear wheel 106 may not turn relative to the body 102.

The front wheel 104 and/or the rear wheel 106 may include a hub motor arrangement 200, which may be a motor, hub motor, hub motor unit, hub motor assembly, and/or hub motor system. While, for purposes of presentation, the following discussion is in the context of a hub motor arrangement 200 that is associated with the rear wheel 106, the present technology also encompasses and includes embodiments in which the hub motor arrangement 200 is associated with the front wheel 104. Certain implementations have a hub motor arrangement 200 in multiple front and/or rear wheels, such as at least two front and/or two rear wheels each with a hub motor arrangement 200. The hub motor arrangement 200 may be powered to drive (e.g., rotate) the rear wheel 106 to propel the vehicle 100 forward or backward. The front and/or rear wheel 104, 106 may include a tire 202, which may also be referred to as a traction element. The tire 202 may be disposed around an outer circumference of the hub motor arrangement 200. The tire 202 may provide improved friction between the front and/or rear wheel 104, 106 and a ground surface. In some embodiments, the tire 202 may include a deformable material, which may include a polymer such as rubber.

In some implementations, at least one of the vehicle's wheels (e.g., the front wheel 104) may not be powered and/or may be configured to rotate freely. As mentioned above, in some embodiments, the front wheel 104 may include a hub motor arrangement 200. In some embodiments, the front wheel 104 may include a hub motor arrangement 200 and the rear wheel 106 may not. In some embodiments, the front and rear wheels 104, 106 include a hub motor arrangement 200.

The hub motor arrangement 200 may be powered by electricity. The hub motor arrangement 200 may be powered by one or more power sources, such as batteries 110, solar cells, or otherwise. The one or more batteries 110 may be disposed on, in, and/or under the body 102 and/or in another location on, in, and/or under the vehicle 100. For example, the one or more vehicle 100 may be disposed under a deck surface of the body 102. The batteries 110 may be replaced or recharged for repeated use of the vehicle 100.

The vehicle 100 may include a controller 116, such as a button, lever, touchscreen, dial, pedal, or otherwise. The controller 116 may be used by a user to at least control the hub motor arrangement 200. For example, the user may be able to control the speed and/or direction of rotation of the hub motor arrangement 200 with the controller 116, which can control the speed and/or direction of travel of the vehicle 100. In some variants, the controller 116 and/or similar feature may be used to control one or more lights, speakers, brakes, and/or other feature(s) of the vehicle 100. The controller 116 can be operably connected with the hub motor arrangement 200, such as with an electric cable. In some embodiments, the vehicle includes a microprocessor in operable communication with the controller 116 and the hub motor arrangement 200. The microprocessor can receive a signal from the controller 116 (e.g., a signal indicative of a throttle amount) and transmit a corresponding direction to the hub motor arrangement 200. The controller 116 can transmit a brake signal, such as a signal to reenergize the motor, drive the motor in the opposite direction, activate a friction brake (e.g., a drum, disk, or caliper brake), etc.

The vehicle 100 may include a kickstand 112. The kickstand 112 may be manually deployed to support the vehicle 100 in an upright position and/or stowed. In some embodiments, the kickstand 112 may be automatically stowed and/or deployed by way of a command from the controller 116.

The vehicle 100 may include a brake unit 108, which may also be referred to as a brake. The brake unit 108 can be manipulated by the user to brake (e.g., stop and/or slow the rotation of) the rear wheel 106. In some embodiments, as mentioned above, the user may instruct, by way of the controller 116, the hub motor arrangement 200 to cease driving the rotation of the rear wheel 106 but the rear wheel 106 may remain free to rotate. The brake unit 108 may be manipulated to brake (e.g., stop and/or slow the rotation of) the rear wheel 106. The brake unit 108, upon manipulation by the user, may apply a surface to a rotating surface of the rear wheel 106 to brake the rear wheel 106. In some embodiments, the user may manipulate the brake unit 108 with a foot and/or the brake unit 108 can be located on a rear of the body 102. In some embodiments, the user may command, by way of the controller 116, that the brake unit 108 brake the rear wheel 106. In some embodiments, the user may command, by way of the controller 116, that the hub motor arrangement 200 cease rotating.

In some embodiments, a hub motor arrangement 200 may by incorporated with all of the wheels of a vehicle or a subset thereof. For example, for a ride-on vehicle with four wheels—only the rear wheels may incorporate hub motor arrangements 200, only the front wheels may incorporate hub motor arrangements 200, or all of the wheels may incorporate hub motor arrangements 200. In another example, for a ride-on vehicle with three wheels with two rear wheels and one front wheel—only the front wheel may incorporate a hub motor arrangement 200, only the two rear wheels may incorporate a hub motor arrangement 200, or all of the wheels may incorporate a hub motor arrangement 200. In another example, for a ride-on vehicle with three wheels with one rear wheel and two front wheels—only the one rear wheel may incorporate a hub motor arrangement 200, only the two front wheels may incorporate a hub motor arrangement 200, or all of the wheels may incorporate a hub motor arrangement 200. The vehicle 100 and/or the hub motor arrangement 200 can include any of the features described in U.S. Pat. No. 9,638,285, the entirety of which is incorporated by reference herein.

Hub Motor Arrangement—FIGS. 2A-7B

FIGS. 2A-2D illustrate various views of the hub motor arrangement 200. The hub motor arrangement 200 may include a housing 201, which may be a hub. The housing 201 may be supported on the vehicle 100 with a first axle 210 (e.g., front shaft) and a second axle 212 (e.g., rear shaft). The first axle 210 and second axle 212 may be coupled to or unitarily formed with the vehicle 100. The first axle 210 and second axle 212 may not rotate, but instead, the housing 201 may rotate with respect to the first axle 210 and second axle 212 to propel the vehicle 100 on a surface. The first axle 210 and second axle 212 may be coaxially aligned to define an axis of rotation for the housing 201. The first axle 210 and second axle 212 may be disposed on opposing sides of the housing 201. In some embodiments, the hub motor arrangement 200 may only have one axle that is coupled to the vehicle 100. For example, if the vehicle 100 is a skateboard or the like, the hub motor arrangement 200 may be supported on one side by a single axle. In some embodiments, one axle may extend through and support opposing sides of the housing 201. In some embodiments, at least one axle protrudes out of the housing 201. Wiring, fibers, or the like can be routed through the first axle 210 and/or second axle 212, such as to provide power to the hub motor arrangement 200.

Figure 2A:
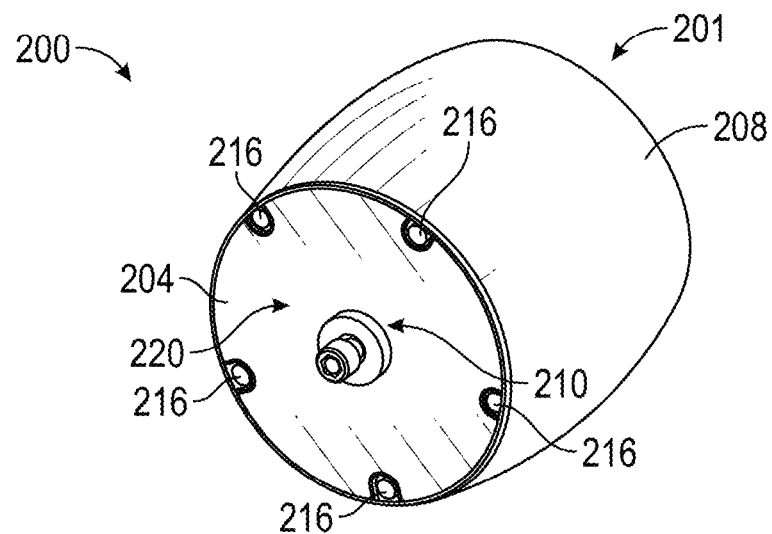
FIGS. 2A-2D illustrate various views of a housing of a hub motor arrangement.
Figure 2B:
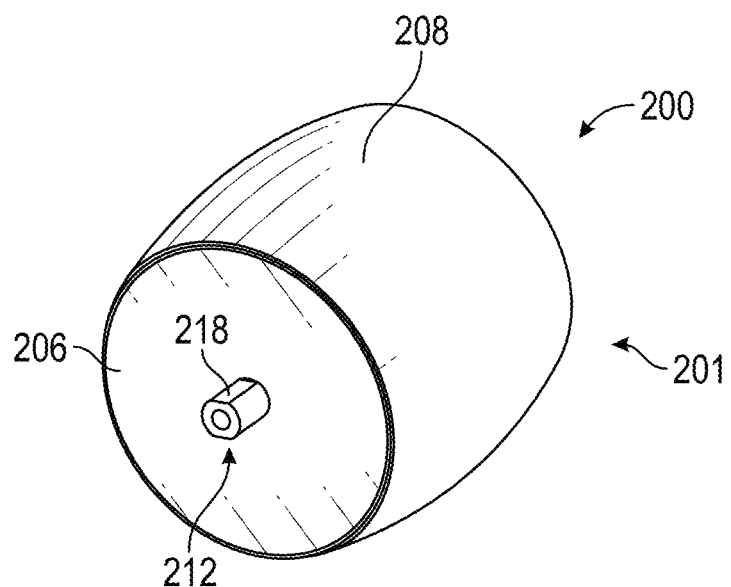
Figure 2C:
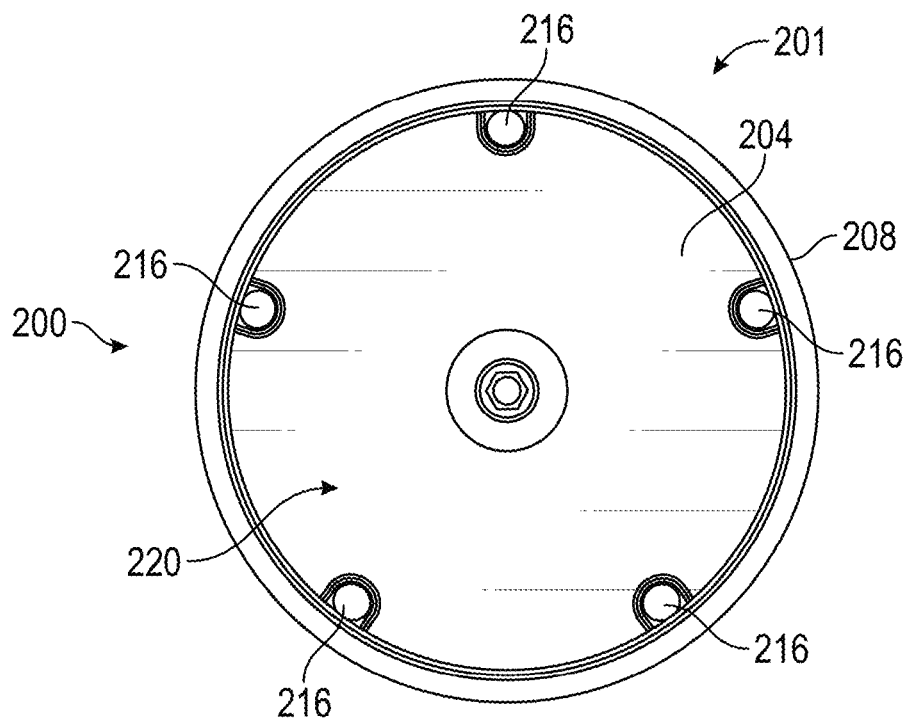
Figure 2D:
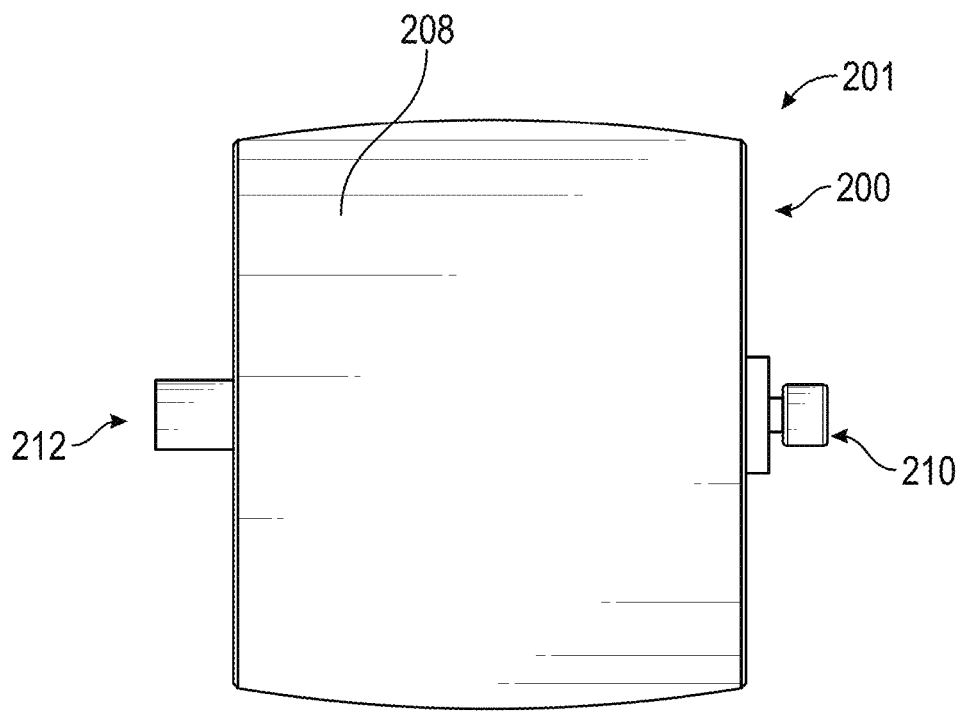

The housing 201 may include an outer wall 208. The outer wall 208 may define a rolling surface of the housing 201. For example, the outer wall 208 way face the ground surface supporting the hub motor arrangement 200. The outer wall 208 may have a circular periphery. The circular periphery may vary along the longitudinal direction of the housing 201. For example, the circular periphery of the outer wall 208 may decrease in size (e.g., taper in diameter) from a middle portion to the sides of the housing 201, as shown in FIG. 2D. As can be seen in FIG. 2D, in some embodiments, the outer wall 208 can have an apex at a centerline perpendicular to the axis of rotation. As further shown, the outer wall can taper downward to a shoulder (with a diameter that is less than the apex) on either side of the centerline. The tapered profile can, for example, enhance grip and/or riding characteristics, such as compared to a wheel with a flat profile. During turning, a wheel with a flat profile can tend to tip and/or reduce the surface area of the wheel that is in contact with the ground, thereby reducing traction and/or stability. The tapered profile can reduce or avoid such issues by allowing the area of contact with the ground to shift, such as from the apex (e.g., when going straight) to at or near the shoulder (e.g., when turning).

The housing 201 may include a cover 220. The cover 220 may be disposed on one side of the housing 201. The cover 220 may cover access (e.g., an opening) to an interior of the housing 201. The cover 220 may be decoupled from the housing 201 to access an interior of the housing 201 and/or components of the hub motor arrangement 200 therein. The cover 220 may be coupled to the housing 201 with a plurality of fasteners 216 (e.g., screws), which may include one, two, three, four, five, six, seven, eight, or more screws. The cover 220 may include a first wall 204. The first wall 204 may define a side of the housing 201. The first axle 210 may extend through the first wall 204. The cover 220 (e.g., first wall 204) may be positioned (e.g., seated) on a rim 236 of the housing 201. The rim 236 may be disposed in the interior 238 of the housing 201. The rim 236 may be disposed proximate an opening to the interior 238. The rim 236 may extend radially inward from an inner periphery of the housing 201. The first wall 204 may be positioned substantially flush with the surrounding portions of the housing 201.

The housing 201 may include a second wall 206. The second wall 206 may be disposed on an opposite side of the housing 201 relative to the first wall 204. The second wall 206 may be unitarily formed with the outer wall 208. The second wall 206 and first wall 204 may be parallel to each other. The first wall 204 and/or second wall 206 may include a circular periphery. The second axle 212 can extend through the second wall 206. The second axle 212 may include a plurality (e.g., two) surfaces 218, which may be flat, to facilitate coupling with the vehicle 100. The surfaces 218 may be parallel relative to each other.

The hub motor arrangement 200 may be different sizes depending on the application. For example, in some embodiments, the housing 201 may have an outer diameter of one hundred and fifty millimeters and/or width from the first wall 204 to the second wall 206 of one hundred and twenty millimeters.

FIGS. 3A and 3B illustrate, respectively, front and rear exploded perspective views of the hub motor arrangement 200. As illustrated, the hub motor arrangement 200 may include a motor unit 232 (e.g., motor), which may be an electrical motor such as a DC brush or brushless motor or the like. The motor unit 232 may be disposed inside an interior 238 of the housing 201. The motor unit 232 may be disposed on the axis of rotation 270, which may include being centered on the axis of rotation 270. As described herein, the motor unit 232 may be powered, such as by the one or more batteries 110.

The hub motor arrangement 200 may include a transmission assembly 264, which may also be referred to as a gearbox, gear assembly, and/or transmission. The transmission assembly 264 may transfer power from the motor unit 232 to drive the rotation of the housing 201. The transmission assembly 264 may be positioned inside of an interior 238 of the housing 201 and closed therein by the cover 220. The transmission assembly 264 may be disposed on the axis of rotation 270, which may include being centered on the axis of rotation 270.

The transmission assembly 264 may include a plurality of gears (e.g., two, three, four, five, six, seven, eight, or more) that may be driven by the motor unit 232 to drive rotation of the housing 201. The transmission assembly 264 may include a first gear 242, which may be a planetary gear. The first gear 242 may be a double gear (e.g., step gear) which may be a double spur gear. The transmission assembly 264 may include a second gear 244, which may also be referred to as an idler gear. The motor unit 232 can drive the first gear 242 and the first gear 242 can drive the second gear 244. In some embodiments, the transmission assembly 264 may include a plurality of first gears 242 (e.g., two, three, four, five, six, seven, eight, or more), which may be planetary gears. In some embodiments, the transmission assembly 264 may include a plurality of second gears 244 (e.g., two, three, four, five, six, seven, eight, or more), which may be idler gears. As described herein, the second gear 244 may drive a ring gear 222 to rotate the housing 201.

The transmission assembly 264 can include a first lateral support 248, which may be a first plate, first mount, first panel, and/or gearbox cover. The first lateral support 248 may have a circular periphery. The transmission assembly 264 can include a second lateral support 234, which may be a second plate, second mount, second panel, and/or gearbox body. The second lateral support 234 may have a circular periphery, which may be larger than the circular periphery of the first lateral support 248. The plurality of gears (e.g., the first gear 242 and second gear 244) can be supported by and disposed between the first lateral support 248 and second lateral support 234.

The first axle 210 may be connected to and extend away from the first lateral support 248. In certain implementation, the first lateral support 248 does not rotate relative to the first axle 210. In some embodiments, the first axle 210 and first lateral support 248 may be unitarily formed together. The first axle 210 may extend through a hole 224 in the first wall 204 of the cover 220. A first bearing 230 (e.g., front bearing) may be disposed on the first axle 210 such that the cover 220 is free to rotate relative to the first axle 210. For example, the first bearing 230 may be disposed on the first axle 210 between the first axle 210 and the cover 220 (e.g., first wall 204 of the cover 220) such that the cover 220 is free to rotate relative to the first axle 210.

The second lateral support 234 may be coupled to the motor unit 232. For example, the second lateral support 234 may include a sleeve 235, which may also be referred to as a sheath or collar. The motor unit 232 may be disposed in the sleeve 235, as shown. The sleeve 235 may extend at least a portion of a length of the motor unit 232. The second lateral support 234 and motor unit 232 may be coupled together such that the second lateral support 234 and motor unit 232 do not rotate relative to each other.

The second axle 212 may be coupled to and extend away from the motor unit 232. The motor unit 232 may not rotate relative to the second axle 212. In some embodiments, the second axle 212 may be unitarily formed with the motor unit 232. The second axle 212 may extend through a hole 226 in the second wall 206 to couple to the vehicle 100. A second bearing 228 (e.g., rear bearing) may be disposed on the second axle 212 such that the housing 201 (e.g., second wall 206 of the housing 201) is free to rotate relative to the second axle 212. For example, the second bearing 228 may be disposed on the second axle 212 between the second axle 212 and the second wall 206 of the housing 201 such that the housing 201 is free to rotate relative to the second axle 212. As described herein, in various implementations, the first axle 210 and second axle 212 do not rotate and/or the housing 201 rotates relative to the first axle 210 and second axle 212 to propel the vehicle 100.

The transmission assembly 264 may include a ring gear 222, which may be an annular gear. The ring gear 222 and housing 201 may rotate together (e.g., not rotate independently relative to each other). The rotation of the ring gear 222 may drive the rotation off the housing 201 to propel a vehicle 100. In use, the motor unit 232 may drive the first gear 242, the first gear 242 may drive the second gear 244, and the second gear 244 may drive the ring gear 222. The ring gear 222 may drive the rotation of the housing 201, which may propel the vehicle 100.

The ring gear 222 may be incorporated with the housing 201 (e.g., cover 220), which may include being unitarily formed together. The ring gear 222 may circumferentially extend around an inner periphery of the cover 220. A central axis of the ring gear 222 may be perpendicularly oriented relative to the first wall 204 of the cover 220 of the housing 201. The central axis of the ring gear 222 may be coaxial with the axis of rotation 270 of the hub motor arrangement 200. The ring gear 222 may extend from an interior surface of the first wall 204. The cover 220 may be coupled to the housing 201, which can be by way of the fasteners 216, such that the rotation of the ring gear 222 and cover 220 drives the rotation of the housing 201. In some embodiments, the cover 220 and the ring gear 222 may be separate components that may be coupled together. In some embodiments, the hub motor arrangement 200 may incorporate a plurality of ring gears. The housing 201 may include a plurality of flanges 240 disposed in the interior 238. The flanges 240 may extend radially inward from an inner periphery of the housing 201. The flanges 240 may provide, for example, support to the transmission assembly 264 and/or structural rigidity to the housing 201.

Figure 4:
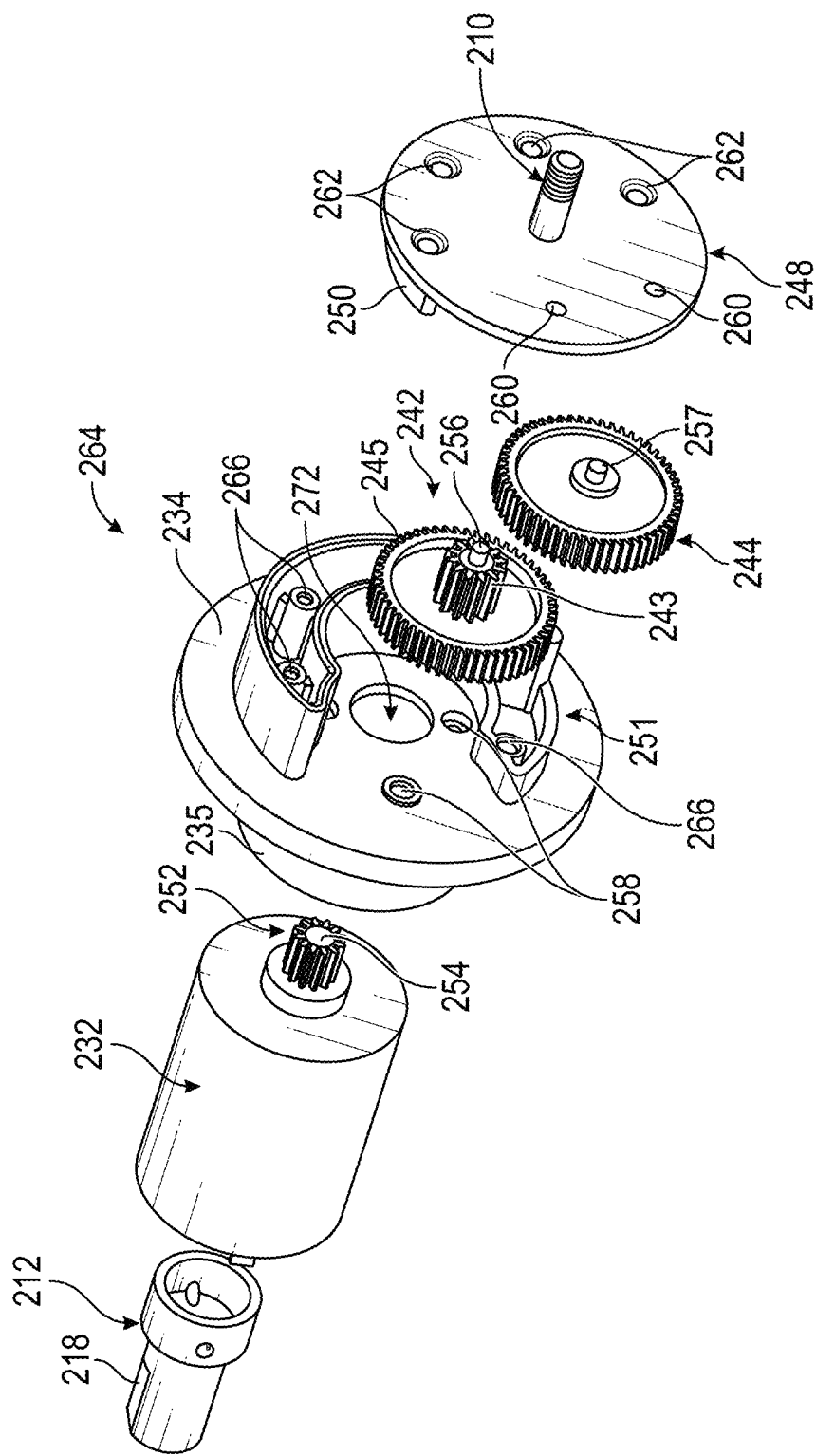
FIG. 4 illustrates a front perspective exploded view of the transmission assembly of the hub motor arrangement of FIGS. 2A-2D with a first lateral support and a second lateral support illustrated.

FIG. 4 illustrates a front perspective exploded view of the transmission assembly 264 of the hub motor arrangement hub motor arrangement 200. As shown, the motor unit 232 may include a drive shaft 254 that may be driven (e.g., rotated) by the motor unit 232. The motor unit 232 may include a motor gear 252 (e.g., sun gear, spur gear, etc.) that may be disposed on the drive shaft 254. The drive shaft 254 and the motor gear 252 may rotate together (e.g., not rotated independently relative to each other). The motor gear 252 may drive the rotation of the first gear 242. When the transmission assembly 264 is assembled, the drive shaft 254 and motor gear 252 may extend through a hole 272 in the second lateral support 234 to drive the first gear 242.

As shown, the first gear 242 can be a double gear (e.g., step gear) such as a double spur gear. The first gear 242 can include an outer gear 245, which may also be referred to as a large gear, and an inner gear 243, which may also be referred to as a small gear. A circumference of the inner gear 243 may be smaller than a circumference of the outer gear 245. The outer gear 245 and the inner gear 243 may be coaxially aligned. The outer gear 245 and the inner gear 243 may be unitarily formed together.

The first gear 242 can be driven by the rotation of the motor gear 252. For example, the outer gear 245 of the first gear 242 may be driven by the motor gear 252. The first gear 242 can drive the rotation of the second gear 244. For example, the inner gear 243 of the first gear 242 may drive the rotation of the second gear 244. The second gear 244 may drive rotation of the ring gear 222. In some embodiments, a width of the outer gear 245 may be smaller than a width of the second gear 244. In some embodiments, the combined width of the inner gear 243 and the outer gear 245 may be greater than a width of the second gear 244.

The transmission assembly 264 may include a plurality of shafts, which may be connecting shafts, rods, and/or pins. The plurality of shafts may include a first shaft 256 and/or a second shaft 257. The first gear 242 may be disposed on the first shaft 256 such that the first gear 242 may rotate relative to the first shaft 256. The second gear 244 may be disposed on the second shaft 257 such that the second gear 244 may rotate relative to the first shaft 256. In some embodiments, a bearing may be disposed on the first shaft 256 and/or second shaft 257 to facilitate rotation between the first gear 242 and the first shaft 256 and/or the second gear 244 and the second shaft 257. The first shaft 256 and/or second shaft 257 may connect with and extend between the second lateral support 234 and the first lateral support 248. For example, the first shaft 256 and/or second shaft 257 may be disposed in holes 258 of the second lateral support 234 and holes 260 of the first lateral support 248.

The second lateral support 234 of the transmission assembly 264 may include a second mount 251, such as a protrusion or spacer. The second mount 251 may space the second lateral support 234 and the first lateral support 248 apart from each other when the second lateral support 234 and the first lateral support 248 are assembled together (e.g., coupled together) to provide protection and/or space for the first gear 242 and/or second gear 244. The second mount 251 may be disposed on a side of the second lateral support 234 opposite the sleeve 235. The second mount 251 may extend away from the second lateral support 234. The second mount 251 may be centered around the hole 272. The second mount 251 may extend circumferentially around the hole 272, which may include less than completely around the hole 272. The hole 272 may be centered around the axis of rotation 270. The second mount 251 may have a C-shape. In some embodiments, the first gear 242 and/or second gear 244 may be disposed within the C-shape, such as in the opening between the ends of the "C". The second mount 251 may be coupled to the first lateral support 248 such that the second lateral support 234 and the first lateral support 248 do not rotate independent relative to each other. The second mount 251 may include one or more holes 266 and/or the first lateral support 248 may include one or more holes 262 that can facilitate coupling the first lateral support 248 to the second mount 251 with one or more fasteners (e.g., screws, bolts, or the like). The second mount 251 may be coupled to a first mount 250, which may be a protrusion and/or spacer, of the first lateral support 248. The first mount 250 may include the one or more holes 262.

Figure 5:
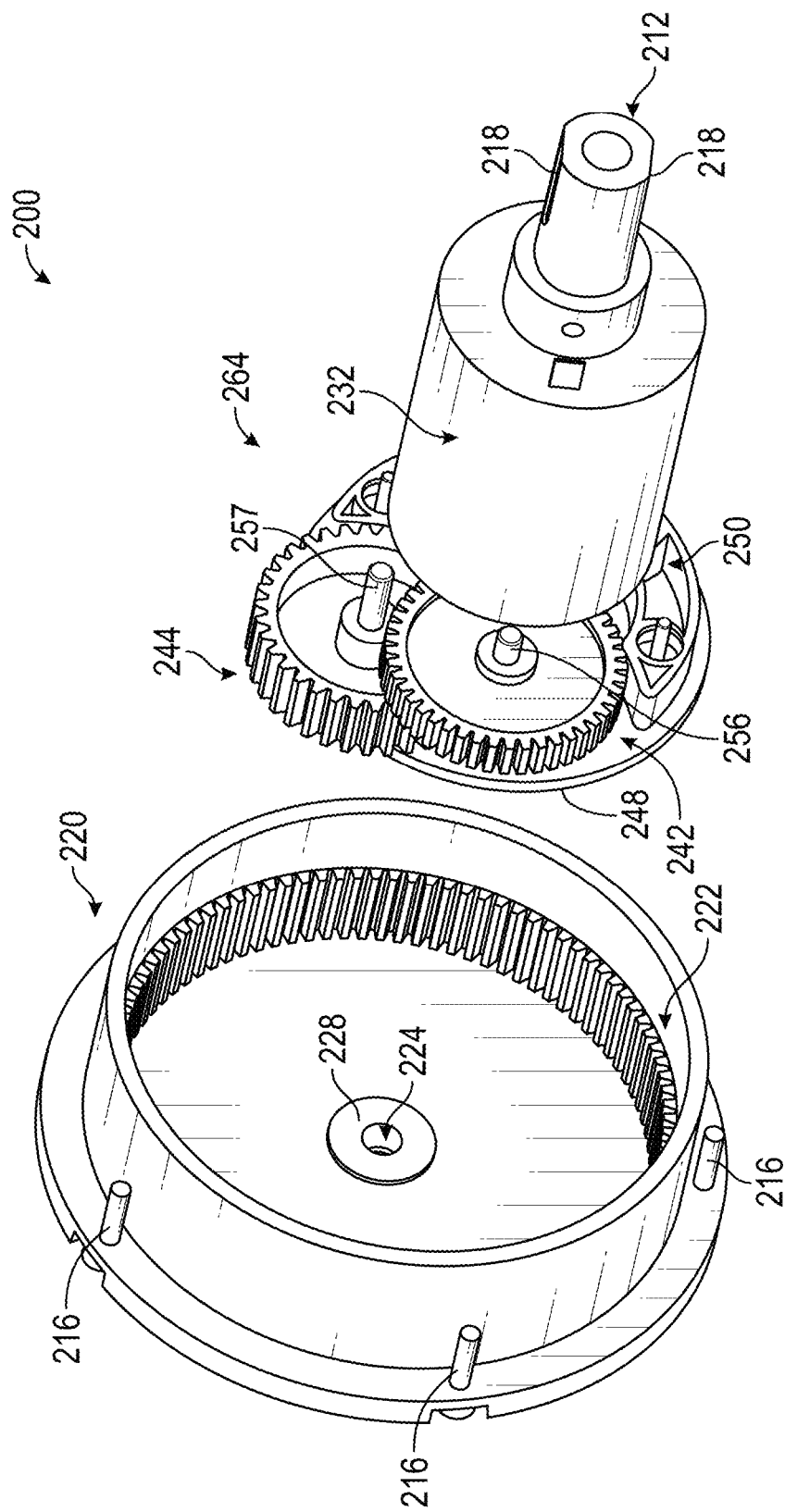
FIG. 5 illustrates a rear perspective exploded view of the transmission assembly of the hub motor arrangement of FIGS. 2A-2D with the first lateral support illustrated and the second lateral support not illustrated in FIG. 5 for purposes of presentation.

The first mount 250 of the first lateral support 248, as illustrated in FIG. 5, may space the first lateral support 248 and second lateral support 234 apart from each other when the second lateral support 234 and the first lateral support 248 are assembled together (e.g., coupled together) to provide space for the first gear 242 and/or the second gear 244. As mentioned above, the second lateral support 234 is not illustrated in FIG. 5 for purposes of presentation. The first mount 250 may be disposed on a side of the first lateral support 248 opposite the first axle 210. The first mount 250 may be centered about the axis of rotation 270. The first mount 250 may extend away from the first lateral support 248. The first mount 250 may correspond in shape and/or size to the second mount 251. The first mount 250 may have a C-shape. The first gear 242 and/or second gear 244 may be disposed within the C-shape. For example, the first gear 242 and/or second gear 244 may be disposed between ends of the C-shape as shown. The first mount 250 and/or second mount 251 may include one or more features to facilitate interfacing between the first mount 250 and/or second mount 251. In various embodiments, the first and second mounts 250, 251 can have corresponding and/or mating shapes.

Figure 6:
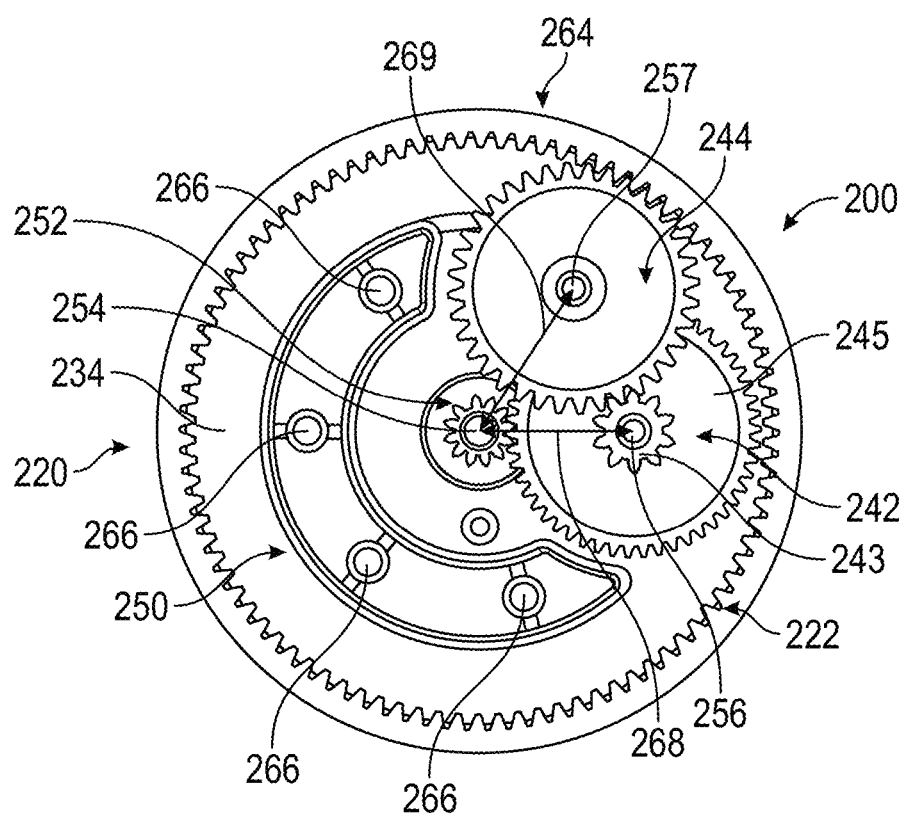
FIG. 6 illustrates a side view of the transmission assembly of FIGS. 2A-2D.

FIG. 6 illustrates a side view of the transmission assembly 264. As illustrated, the motor gear 252 may interface with the first gear 242 (e.g., idler gear) to drive the rotation of the first gear 242. For example, the motor gear 252 may interface with the outer gear 245 of the first gear 242. The first gear 242 may interface with the second gear 244 (e.g., planetary gear) to drive rotation of the second gear 244. For example, the inner gear 243 of the first gear 242 may interface with the second gear 244 to drive the rotation of the second gear 244. The second gear 244 may interface with the ring gear 222 to drive the rotation of the ring gear 222 and housing 201, which can propel the vehicle 100.

The second gear 244 (e.g., a radial center of the second gear 244) may be positioned farther away from the axis of rotation of the hub motor arrangement 200 (e.g., housing 201) compared to the first gear 242 (e.g., a radial center of the first gear 242). The first gear 242 may be disposed a first distance 268 away from the axis of rotation 270 of the hub motor arrangement 200. For example, a first axis of rotation of the first gear 242 can be disposed the first distance 268 away from the axis of rotation 270. The second gear 244 may be disposed a second distance 269 away from the axis of rotation 270 of the hub motor arrangement 200. For example, a second axis of rotation of the second gear 244 can be disposed the second distance 269 away from the axis of rotation 270. The second distance 269 may be larger than the first distance 268. Positioning the axis of rotation of the second gear 244 farther away from the axis of rotation of the hub motor arrangement 200 (e.g., housing 201) compared to the first gear 242 can enable a larger ring gear 222 (e.g., larger diameter) to be incorporated into the transmission assembly 264 to provide a larger gear ratio for increased torque, which may provide one or more of the benefits described herein. In some embodiments, multiple first gears 242 and/or second gears 244 may be incorporated into the transmission assembly 264. The diameter of the first gear 242 (e.g., outer gear 245) and second gear 244 may be the same. In some embodiments, the diameter of the first gear 242 may be larger than the second gear 244. In some embodiments, the diameter of the first gear 242 may be smaller than the second gear 244. In some embodiments, the second gear 244 may be a double gear (e.g., step gear) and an inner gear of the second gear 244 may interface with the first gear 242 or the ring gear 222. In some embodiments, second gear 244 may be a double gear (e.g., step gear) and an outer gear of the second gear 244 may interface with the first gear 242 or the ring gear 222.

Figure 7A:
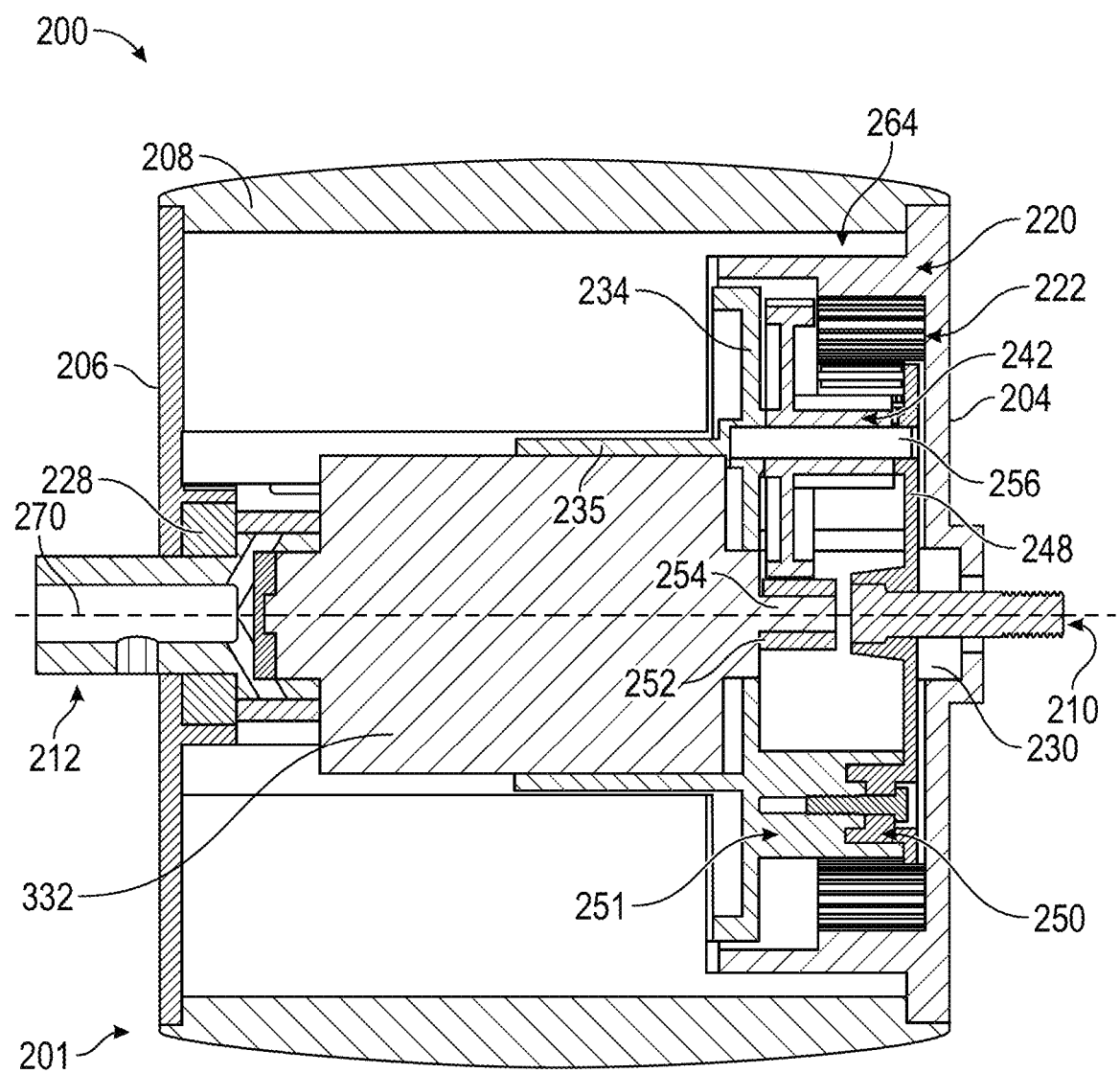
FIG. 7A illustrates an assembled cross-sectional view of the hub motor arrangement of FIGS. 2A-2D.
Figure 7B:
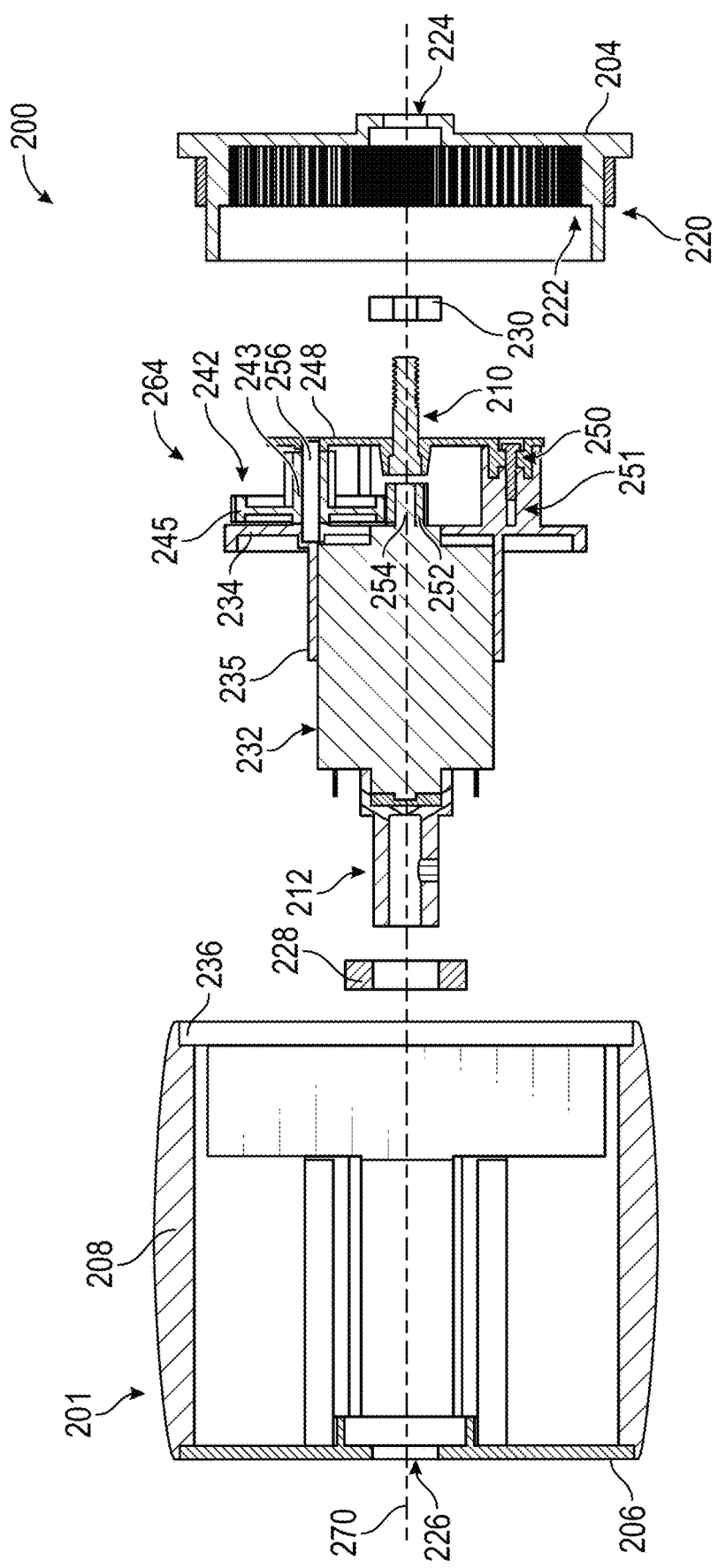
FIG. 7B illustrates an exploded cross-sectional view of the hub motor arrangement of FIGS. 2A-2D.

FIGS. 7A and 7B show cross-sectional views of the hub motor arrangement 200. As shown in FIG. 7A, the motor unit 232 and transmission assembly 264 can be compactly stowed within the housing 201. The first mount 250 of the first lateral support 248 and the second mount 251 of the second lateral support 234 can interface and/or otherwise contact and be coupled together to provide space for the plurality of gears of the transmission assembly 264. In various embodiments, as shown in FIG. 7A, substantially all or all of the transmission assembly 264 (not including the first and second axles 210, 212) is positioned radially within the outer wall 208, laterally between the first and second walls 204, 206, and/or radially and laterally encapsulated within the first and second walls 204, 206 and the outer wall 208.

The motor unit 232 can be disposed on the axis of rotation 270. The transmission assembly 264 can be disposed on the axis of rotation 270. The transmission assembly 264 may be disposed entirely on one half of the hub motor arrangement 200. The motor unit 232 may be disposed on both sides of a central plane of the hub motor arrangement 200. The first axle 210 and/or second axle 212 may be disposed on the axis of rotation 270. The first axle 210 and/or second axle 212 may form a distributed axle protruding from both sides of the housing 201 but not through a middle portion of the housing 201.

In use, the second axle 212, motor unit 232, second lateral support 234, first lateral support 248, and first axle 210 may remain fixed in position relative to each other (e.g., not rotate independently relative to each other) as the housing 201 rotates about the first axle 210 and second axle 212 to propel the vehicle. Furthermore, the axes of rotation of the first gear 242 and the second gear 244 may remain fixed in position relative to the axis of rotation 270 of the housing 201 as the housing 201 rotates.

Figure 8:
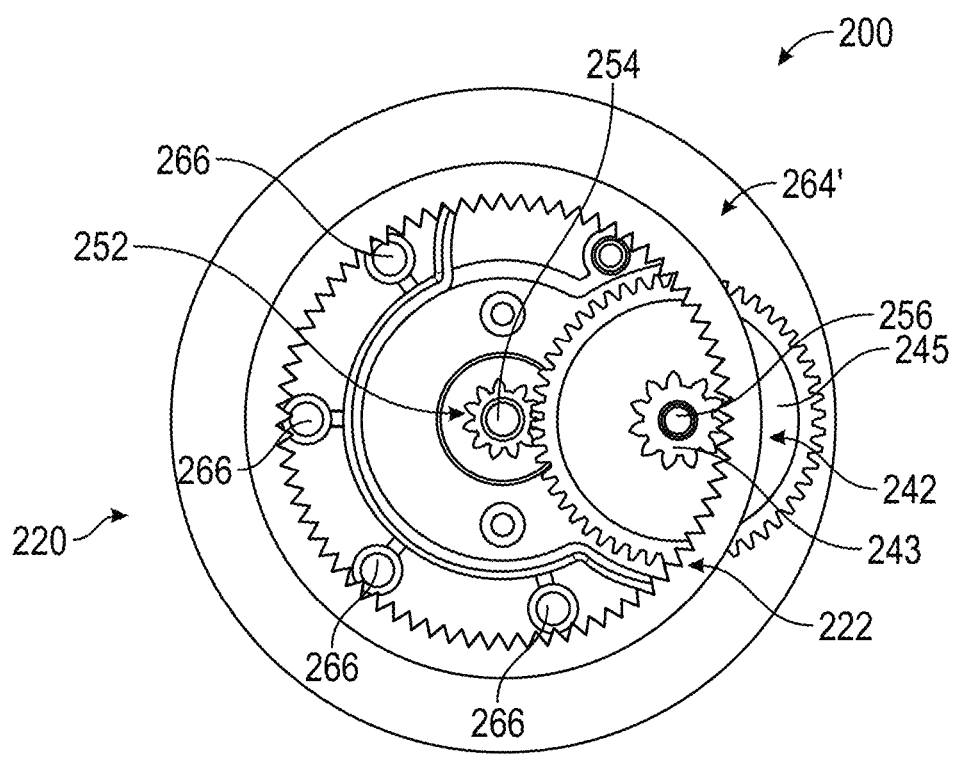
FIG. 8 illustrates a side view of an alternative transmission assembly without a second gear and with a smaller ring gear compared to the ring gear shown in FIG. 6.

Alternative Arrangement of Transmission Assembly—FIG. 8

With reference to FIG. 8, an alternative arrangement for the transmission assembly 264' is illustrated. The transmission assembly 264' can be implemented in the hub motor arrangement 200 discussed above and/or incorporated into the vehicle 100. As can be seen, this alternative embodiment omits the second gear 244. Without the second gear 244, the first gear 242 (e.g., gear, double gear, step gear) may drive the ring gear 222. For example, the inner gear 243 of the first gear 242 may drive the ring gear 222. In some embodiments, the outer gear 245 of the first gear 242 may drive the ring gear 222. Without the second gear 244, the ring gear 222 may be smaller (e.g., smaller in diameter) compared to the ring gear 222 incorporated into the arrangement of the transmission assembly 264 with the second gear 244, which may result in a smaller gear ratio, less torque, greater rotational speed of the ring gear (and thus the wheel), fewer components that need to be assembled and are potential points of failure, and/or reduced complexity.

Figure 9C:
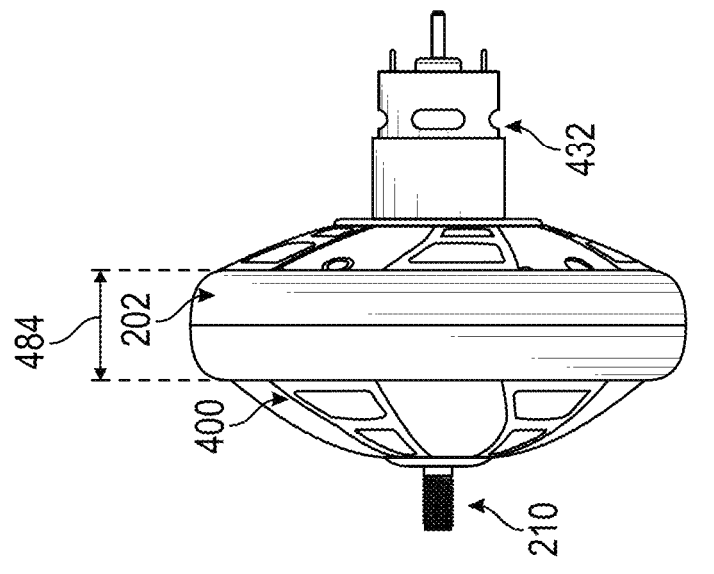
FIGS. 9A-9C illustrate various views of another hub motor arrangement.
Figure 9B:
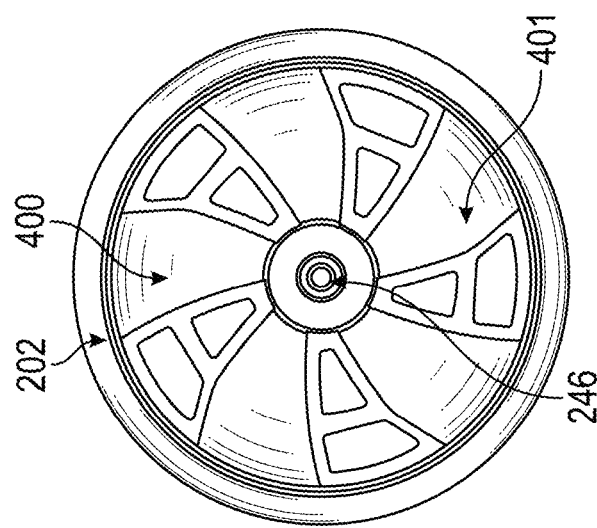
Figure 9A:
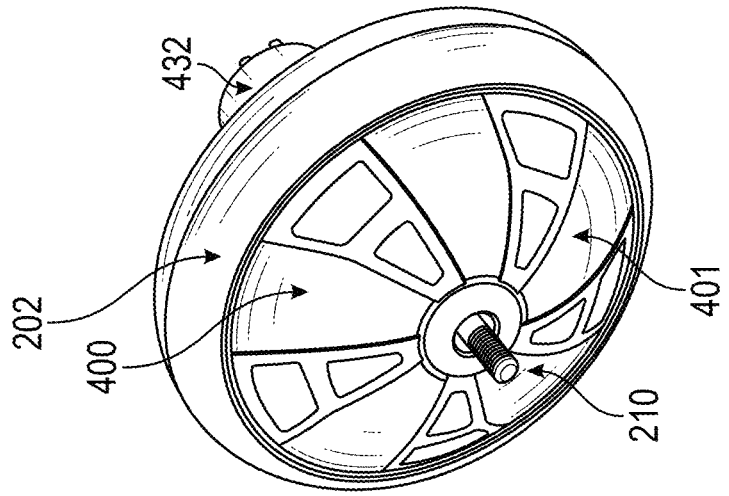
Figure 10:
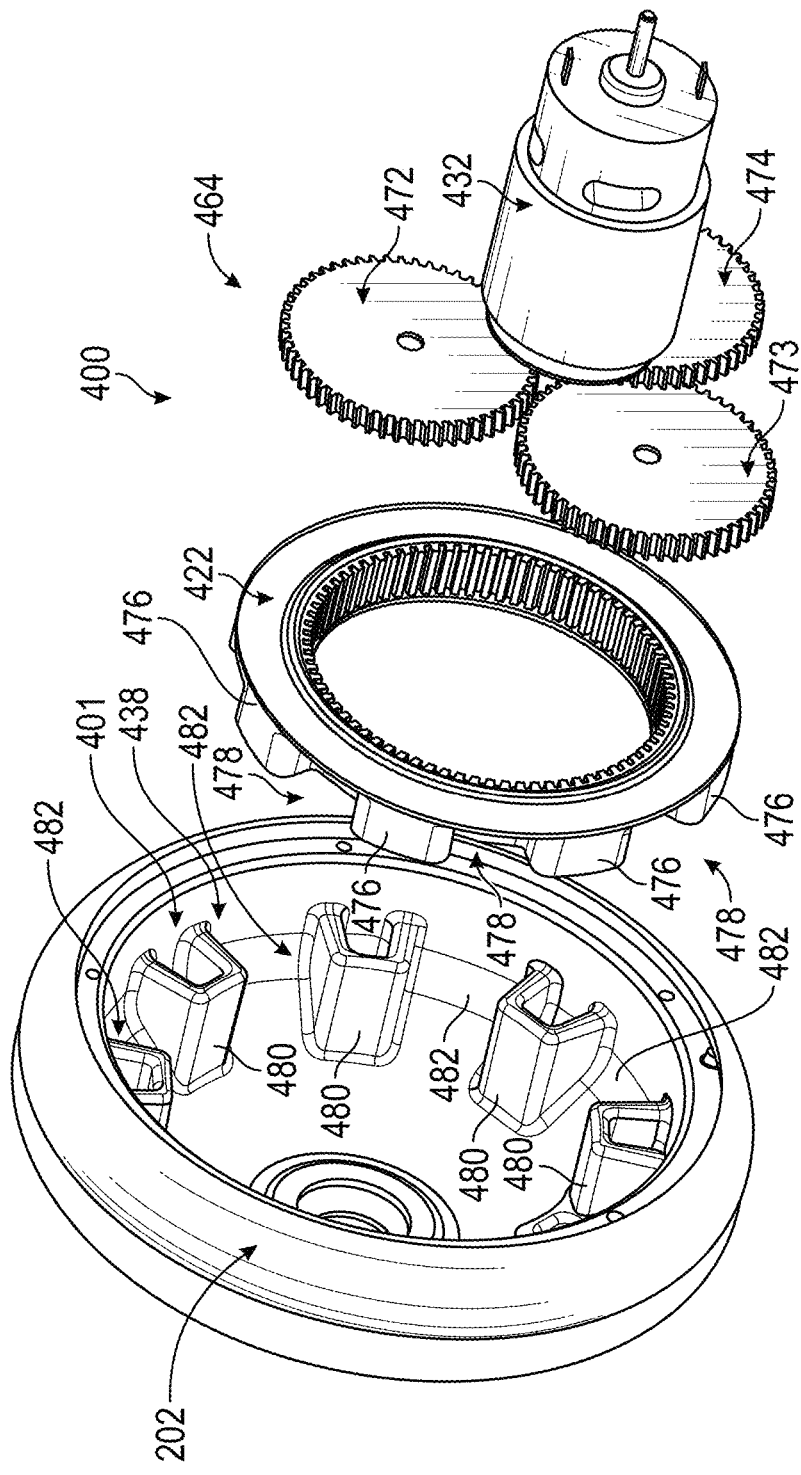
FIG. 10 illustrates a rear perspective exploded view of the transmission assembly of the hub motor arrangement of FIGS. 9A-9C.

Alternative Hub Motor Arrangement—FIGS. 9A-10

With reference to FIGS. 9A-10, an alternative hub motor arrangement 400 is illustrated. The hub motor arrangement 400 may be similar to the other hub motor arrangements described herein (e.g., hub motor arrangement 200) but include the differences disclosed herein.

As shown in FIGS. 9A-9C, the hub motor arrangement 400 may include a housing 401. The tire 202 and/or tire mounting surface may be disposed around the housing 401 (e.g., around a circumference of the housing 401). The hub motor arrangement 400 may include a first axle 210 that may support the hub motor arrangement 400 on the vehicle 100. The first axle 210 may extend from one side of the housing 401. The hub motor arrangement 400 may include a motor unit 432 that may drive a rotation of the housing 401. The motor unit 432 may extend from the opposing side of the housing 401 relative to the first axle 210. The motor unit 432 may be an axle that may support the hub motor arrangement 400 on the vehicle 100. The first axle 210 and the motor unit 432 may form a distributed axle that supports the housing 401 on the vehicle 100. The first axle 210 and/or motor unit 432 may be centered on an axis of rotation of the housing 401.

The hub motor arrangement 400 may be different sizes depending on the application. For example, in some embodiments, the housing 401 may have an outer diameter of one hundred and fifty millimeters, which may include the tire 202, and/or width of a tire 202 and/or surface to seat the tire 202 (e.g., distance 484) of thirty-five millimeters.

FIG. 10 illustrates a perspective exploded view of at least some of the components of a transmission assembly 464 of the hub motor arrangement 400. The transmission assembly 464 may include a motor unit 432 that may drive a rotation of a plurality of a plurality of planetary gears. The motor unit 432 may include a motor gear, which may be a sun gear, that drives the plurality of planetary gears. The plurality of planetary gears may include a first planetary gear 472, second planetary gear 473, and/or third planetary gear 474. The first planetary gear 472, second planetary gear 473, and/or third planetary gear 474 may be the same size, shape, and/or type of gear. In some embodiments, the first planetary gear 472, second planetary gear 473, and/or third planetary gear 474 may be different sizes, shapes, and/or types of gear. The first planetary gear 472, second planetary gear 473, and/or third planetary gear 474 may be double gears (e.g., step gears) that include inner and outer gears.

The transmission assembly 464 may include a ring gear 422. The ring gear 422 may be a separate component from the housing 401. In some embodiments, the ring gear 422 may be unitarily formed with the housing 401. The ring gear 422 may include a plurality of protrusions 476, which may be projections and/or flanges. The plurality of protrusions 476 may be circumferentially distributed around the ring gear 422 (e.g., around an outward facing surface of the ring gear 422). The ring gear 422 may include a plurality of gaps 478, which may be recesses and/or slots. The gaps 478 may be disposed between adjacent protrusions 476.

The housing 401 may include a plurality of protrusions 480, which may be projections and/or flanges. The plurality of protrusions 480 may be circumferentially distributed around an inner periphery of the housing 401. The housing 401 may include a plurality of gaps 482, which may be recesses and/or slots. The gaps 482 may be disposed between adjacent protrusions 480. The plurality of protrusions 480 of the housing 401 may correspond to the plurality of gaps 478 of the ring gear 422 such that the protrusions 480 may be inserted (e.g., press fit) into the gaps 478 to couple the housing 401 and the ring gear 422 together such that the housing 401 rotates with the ring gear 422. The plurality of gaps 482 of the housing 401 may correspond to the plurality of protrusions 476 of the ring gear 422 such that the protrusions 476 may be inserted (e.g., press fit) into the gaps 482 to couple the housing 401 and the ring gear 422 together such that the housing 401 rotates with the ring gear 422.

In use, the motor unit 432 may drive the first planetary gear 472, second planetary gear 473, and/or third planetary gear 474. The first planetary gear 472, second planetary gear 473, and/or third planetary gear 474 may drive the ring gear 422. The rotation of the ring gear 422, when coupled to or unitarily formed with the housing 401, may rotate the housing 401 to propel the vehicle 100 incorporating the hub motor arrangement 400.

In some embodiments, the outer gears of the first planetary gear 472, second planetary gear 473, and/or third planetary gear 474 may interface with and be driven by the motor gear of the motor unit 432. The inner gears of the first planetary gear 472, second planetary gear 473, and/or third planetary gear 474 may drive the ring gear 422. In some embodiments, the inner gears of the first planetary gear 472, second planetary gear 473, and/or third planetary gear 474 may interface with and be driven by the motor gear of the motor unit 432. The outer gears of the first planetary gear 472, second planetary gear 473, and/or third planetary gear 474 may interface with and drive the ring gear 422.

Without the inclusion of one or more idler gears in the transmission assembly 464, as described in reference to the hub motor arrangement 200, the size of the ring gear 422 (e.g., diameter) may be smaller, which may result in a smaller gear ratio and less torque.

Certain Terminology

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees and the term "generally perpendicular" can refer to something that departs from exactly perpendicular by less than or equal to 20 degrees.

Summary

Various hub motor arrangement devices, systems, and methods have been disclosed in the context of certain embodiments and examples. Nevertheless, the scope of this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the hub motor arrangement and vehicles incorporating the hub motor arrangement. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations (e.g., the order of torque transmission from gear to gear) may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations (e.g., additional gears) can be performed before, after, simultaneously, or between any of the described operations. Further, the operations may be rearranged or reordered in other implementations. Also, the separation of various system components in the implementations described above should not be understood as requiring such separation in all implementations. The described components and systems can generally be integrated together in a single product or packaged into multiple products. Additionally, other implementations are within the scope of this disclosure.

Some embodiments have been described in connection with the accompanying drawings. The figures are drawn to scale, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of hub motor arrangements, systems, and methods have been disclosed. This disclosure expressly contemplates that various features and aspects of the disclosed embodiments can be combined with, or substituted for, one another. Accordingly, the scope of this disclosure should not be limited by the particular disclosed embodiments and examples described above, but should be determined only by a fair reading of the claims that follow.

The following is claimed:

1. A hub motor arrangement for a vehicle, the hub motor arrangement comprising:
    a housing configured to rotate about a housing axis of rotation on a first axle and a second axle;
    a motor unit disposed at least partially within the housing, the motor unit comprising a motor gear;
    a first gear and a second gear, the first gear having a first axis of rotation a first distance away from the housing axis of rotation, and the second gear having a second axis of rotation a second distance away from the housing axis of rotation, the second distance larger than the first distance; and
    a ring gear inside the housing, the ring gear configured to rotate with the housing;
    wherein the motor gear is configured to drive the first gear, the first gear is configured to drive the second gear, and the second gear is configured to drive the ring gear to rotate the housing.

2. The hub motor arrangement of claim 1, wherein the first axle and the second axle are disposed on opposing sides of the housing.

3. The hub motor arrangement of claim 1, wherein the first axle and the second axle do not extend through an entirety of the housing.

4. The hub motor arrangement of claim 1, wherein the first axle and the second axle are configured to be coupled to a vehicle to support the hub motor arrangement.

5. The hub motor arrangement of claim 1, wherein the first gear is a double gear comprising an outer gear and an inner gear, wherein the motor gear is configured to interface with the outer gear of the first gear, and wherein the inner gear of the first gear is configured to interface with the second gear.

6. The hub motor arrangement of claim 1, further comprising a first bearing and a second bearing, the first bearing disposed on the first axle between the first axle and the housing, and the second bearing disposed on the second axle between the second axle and the housing.

7. The hub motor arrangement of claim 1, wherein the ring gear is unitarily formed with the housing.

8. The hub motor arrangement of claim 1, wherein the ring gear is coupled to the housing.

9. A vehicle comprising the hub motor arrangement of claim 1, the hub motor arrangement configured to be disposed in a wheel of the vehicle.

10. The vehicle of claim 9, wherein the vehicle is an electric scooter comprising handle bars, a deck, and a battery.

11. The vehicle of claim 9, wherein the vehicle is a three-wheeled ride-on vehicle.

12. The vehicle of claim 9, wherein the vehicle is a four-wheeled ride-on vehicle.

13. The hub motor arrangement of claim 1, wherein the housing comprises an outer wall, the outer wall comprising a circular profile that tapers in diameter from a middle portion to lateral portions, the middle portion comprising a larger diameter than the lateral portions.

14. A hub motor arrangement for a vehicle, the hub motor arrangement comprising:
    a hub configured to rotate about a hub axis of rotation on a first shaft and a second shaft;
    a motor disposed at least partially within the hub, the motor comprising a motor gear;
    a step gear and an idler gear, the step gear having a first axis of rotation a first distance away from the hub axis of rotation, and the idler gear having a second axis of rotation a second distance away from the hub axis of rotation, the second distance larger than the first distance; and
    a ring gear inside the hub, the ring gear configured to rotate with the hub;
    wherein the motor gear is configured to drive the step gear, the step gear is configured to drive the idler gear, and the idler gear is configured to drive the ring gear to rotate the hub.

15. The hub motor arrangement of claim 14, further comprising a gearbox body and a gearbox cover, wherein the step gear and the idler gear are disposed between the gearbox body and the gearbox cover.

16. The hub motor arrangement of claim 15, wherein the gearbox body and the gearbox cover are disposed within the hub.

17. The hub motor arrangement of claim 15, wherein the gearbox body comprises a sleeve, the sleeve disposed around the motor.

18. The hub motor arrangement of claim 15, wherein the gearbox cover comprises a first mount configured to contact the gearbox body to space the gearbox cover away from the gearbox body.

19. The hub motor arrangement of claim 15, wherein the gearbox body comprises a second mount configured to contact the gearbox cover to space the gearbox cover away from the gearbox cover.

* * * * *